(12) United States Patent
Hyoudou

(10) Patent No.: US 8,797,976 B2
(45) Date of Patent: Aug. 5, 2014

(54) NODE, COMPUTER-READABLE MEDIUM STORING COMMUNICATION PROGRAM, AND COMMUNICATION METHOD

(75) Inventor: Kazuki Hyoudou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 478 days.

(21) Appl. No.: 13/045,965

(22) Filed: Mar. 11, 2011

(65) Prior Publication Data

US 2011/0228686 A1   Sep. 22, 2011

(30) Foreign Application Priority Data

Mar. 18, 2010   (JP) .................................. 2010-62821

(51) Int. Cl.
*H04W 56/00* (2009.01)
*H04W 52/02* (2009.01)

(52) U.S. Cl.
USPC ........................................ 370/329; 370/235

(58) Field of Classification Search
None
See application file for complete search history.

(56) References Cited

U.S. PATENT DOCUMENTS

| | | | |
|---|---|---|---|
| 2008/0253287 A1* | 10/2008 | Gupta et al. | 370/235 |
| 2009/0296610 A1* | 12/2009 | Bugenhagen | 370/286 |
| 2010/0103935 A1* | 4/2010 | Sairanen | 370/392 |
| 2010/0177708 A1* | 7/2010 | Pandey et al. | 370/329 |

FOREIGN PATENT DOCUMENTS

| | | |
|---|---|---|
| JP | 2001-268105 | 9/2001 |
| JP | 2006-279852 | 10/2006 |

* cited by examiner

*Primary Examiner* — Asad Nawaz
*Assistant Examiner* — Jason Harley
(74) *Attorney, Agent, or Firm* — Fujitsu Patent Center

(57) ABSTRACT

A computer of a first node executes primary communication and secondary communication between a first node group and a second node group provided with nodes. On the basis of the transmission capabilities of a network, the computer computes the required time required to transmit data that has been designated as outgoing data since the start time of a periodically executed transmission process up until the current time, wherein the designated data is data from among the received data that has been successively designated as outgoing data. The computer determines whether or not the time equal to the current time plus the required time matches the start time of the primary communication periodically conducted between the nodes. On the basis of the determined results, the computer decides which data from among the received data to designate as outgoing data.

20 Claims, 29 Drawing Sheets

ADDRESS TABLE ~500

| NODE NAME | SYSTEM ADDRESS | GROUP ADDRESS | PHYSICAL ADDRESS | JUNCTION NODE INFORMATION |
|---|---|---|---|---|
| N1 | 10.xxx.1.1 | 172.xxx.1.1 | 0000000001 | YES |
| N2 | 10.xxx.1.2 | 172.xxx.1.2 | 0000000002 | NO |
| N3 | 10.xxx.1.3 | 172.xxx.1.3 | 0000000003 | NO |
| N4 | 10.xxx.1.4 | 172.xxx.2.1 | 0000000004 | YES |
| N5 | 10.xxx.1.5 | 172.xxx.2.2 | 0000000005 | NO |
| N6 | 10.xxx.1.6 | 172.xxx.2.3 | 0000000006 | NO |
| N7 | 10.xxx.1.7 | 172.xxx.3.1 | 0000000007 | YES |
| N8 | 10.xxx.1.8 | 172.xxx.3.2 | 0000000008 | NO |
| N9 | 10.xxx.1.9 | 172.xxx.3.3 | 0000000009 | NO |
| N10 | 10.xxx.1.10 | 172.xxx.4.1 | 0000000010 | YES |
| N11 | 10.xxx.1.11 | 172.xxx.4.2 | 0000000011 | NO |
| N12 | 10.xxx.1.12 | 172.xxx.4.3 | 0000000012 | NO |

FIG. 10

| FORWARDING ADDRESS | QUEUE ID |
|---|---|
| 0000000002 (PHYSICAL ADDRESS) | Q1 |
| 0000000003 (PHYSICAL ADDRESS) | Q2 |
| VL1-2 | Q3 |
| VL1-3 | Q4 |
| VL1-4 | Q5 |

QUEUE ASSOCIATION TABLE ~1000

ALLOCATED STREAM RATE/SENT DATA SIZE ASSOCIATION TABLE — 1100

| FORWARDING ADDRESS | ALLOCATED STREAM RATE (BYTES/CYCLE C2) | SENT DATA SIZE (BYTES) |
|---|---|---|
| 0000000002 (PHYSICAL ADDRESS) | 150000 | 0 |
| 0000000003 (PHYSICAL ADDRESS) | 200000 | 0 |
| VL1-2 | 200000 | 0 |
| VL1-3 | 1500 | 0 |
| VL1-4 | 10000 | 0 |

FIG. 13

REALTIME COMMUNICATION ALLOCATED STREAM RATE TABLE — 1300

| ALLOCATION ID | ALLOCATED STREAM RATE (BYTES) | SOURCE ADDRESS (SYSTEM/GROUP) | | DESTINATION ADDRESS (SYSTEM/GROUP) | |
|---|---|---|---|---|---|
| R1 | 4000 | 10.xxx.1.6 | 172.xxx.2.3 | 10.xxx.1.2 | 172.xxx.1.2 |
| R2 | 500 | 10.xxx.1.3 | 172.xxx.1.3 | 10.xxx.1.5 | 172.xxx.2.2 |
| R3 | 100 | 10.xxx.1.5 | 172.xxx.2.2 | 10.xxx.1.8 | 172.xxx.3.2 |
| R4 | 1200 | 10.xxx.1.3 | 172.xxx.1.3 | 10.xxx.1.9 | 172.xxx.3.3 |

REALTIME COMMUNICATION ALLOCATED STREAM RATE TABLE — 1700

| ALLOCATION ID | ALLOCATED STREAM RATE (BYTES) | SOURCE ADDRESS (SYSTEM/GROUP) | | DESTINATION ADDRESS (SYSTEM/GROUP) | |
|---|---|---|---|---|---|
| R1 | 4000 | 10.xxx.1.6 | 172.xxx.2.3 | 10.xxx.1.2 | 172.xxx.1.2 |

1700-1

NODE, COMPUTER-READABLE MEDIUM STORING COMMUNICATION PROGRAM, AND COMMUNICATION METHOD

CROSS-REFERENCE TO RELATED APPLICATIONS

This application is based upon and claims the benefit of priority of the prior Japanese Patent Application No. 2010-062821, filed on Mar. 18, 2010, the entire contents of which are incorporated herein by reference

FIELD

The embodiments discussed herein are related to communication between nodes on a network.

BACKGROUND

Control apparatus for machines such as automobiles, industrial robots, and humanoid robots are now being modularized on a per-function basis. Also, with the arrival of sensors equipped with network functions, it is becoming typical for the client apparatus (i.e., modules) provided in a machine control apparatus to form a network.

In a machine control apparatus that includes such a network, realtime communication and non-realtime communication typically coexist. Realtime communication refers to communication in which data transfer is guaranteed to be completed within a given time interval. Realtime communication may include communication used for feedback control by the machine control apparatus, wherein relatively small amounts of data (on the order of several dozen to several hundred bytes) are periodically (i.e., every few milliseconds) sent and received with extremely low latency.

Realtime communication also includes isochronous communication in protocols such as USB 2.0 and IEEE 1394. In such isochronous communication, guaranteed transfers are scheduled on an extremely short cycle period (several dozen to several hundred microseconds), and several kilobytes of data are transmitted during each transfer. Such isochronous communication is conducted in order to transfer audio, video, or similar data without delays. Herein, USB is an abbreviation of Universal Serial Bus, while IEEE is an abbreviation of the Institute of Electrical and Electronics Engineers.

In contrast to realtime communication, non-realtime communication refers to communication that does not demand realtime performance. Non-realtime communication may include, for example, delivery of application patches, file transfers, and other communication that is comparatively resistant to latency, but which demands high throughput.

Meanwhile, with machine control apparatus that include networks as described earlier, there is a desire to use general-purpose networks (such as Ethernet™, for example) that include routing equipment such as switches along the network paths. The desire to use such networks comes from the perspective of system flexibility, expandability, and ease of setup.

However, with a switch, if a plurality of inputs transferred to the same output terminal exceed the throughput of that output terminal, then a communication queue will develop inside the switch. For this reason, in networks that include switches partway along the network paths, the development of communication queues results in increased communication latency and can even lead to packet loss, thereby making it difficult to suitably execute realtime communication.

In the related art, there exists technology that utilizes the periodicity of realtime communication to make a timewise separation between the intervals during which realtime communication and non-realtime communication are carried out. More specifically, a relay apparatus that relays iso-data packets between client apparatus is provided. When there is competition among a plurality of iso-data packets, a plurality of iso-data packets are bundled together and output successively, thereby shortening the period during which the output of non-iso-data packets is restrained.

There also exists technology for reliably transmitting media data such as audio and video. More specifically, a data transfer method involves reserving in advance the resources (network bandwidth, for example) required to execute data transfer between information transmitting apparatus on a network, and then performing a packet routing processes using the reserved resources.

However, when the related art described above is implemented on a network that connects client apparatus via a plurality of switches, it is difficult to control the stream rates of non-realtime communication on the paths connecting the switches in an environment where realtime communication and non-realtime communication coexist. For this reason, there is a problem in that communication collisions become unavoidable on the paths connecting the switches, and guaranteeing the realtime performance of realtime communication is difficult.

In contrast, if a system configuration that connects client apparatus via a plurality of switches is not implemented, there is a problem in that the maximum number of client apparatuses that can be connected to the system becomes limited, and system flexibility and expandability is reduced.

In the related art described above, it is also conceivable to make a timewise separation between the intervals during which realtime communication and non-realtime communication are carried out, such that while realtime communication is being carried out, non-realtime communication is stopped, and collisions with realtime communication are avoided. However, if all non-realtime communication is stopped during realtime communication, it is anticipated that the overall throughput of the network will drop.

SUMMARY

According to an aspect of the invention, a computer of a first node that executes primary communication and secondary communication via a network between a first node group and a second node group, the first node group including the first node and a second node, the second node group including a third node and a fourth node. The first node sets a communication path via the network between the first node and the third node. The first node takes data from among data received from the second node, and designate the data as outgoing data, the designated data being data related to secondary communication conducted between the second node and the fourth node. The first node transmits the data that was designated as outgoing data to the third node via the communication path. The first node computes, based on transmission capabilities of the network, a required time to transmit data that has been designated as outgoing data from a start time of a periodically executed transmission process up until a current time. The first node determines whether a time equal to the current time plus the required time matches the start time of the primary communication periodically conducted between the second node and the fourth node. The first node decides which data from among the received data to designate as outgoing data based on information.

The object and advantages of the invention will be realized and attained by at least the features, elements, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 10 illustrates one example of the stored contents of a queue association table;

FIG. 13 illustrates a first example of the stored contents of a realtime communication allocated stream rate table;

FIG. 17 illustrates a second example of the stored contents of a realtime communication allocated stream rate table;

DESCRIPTION OF EMBODIMENTS (Embodiment of Communication Technique)

First, one example of a communication technique in accordance with an embodiment will be described. With this communication technique, communication between nodes is controlled on a local network where primary communication and secondary communication coexist. Communication is controlled such that the primary communication and the secondary communication do not collide.

Herein, the primary communication is communication that is periodically executed between some of the nodes in a node group included on the local network. For example, the primary communication may be realtime communication used for feedback control by a machine control apparatus, or isochronous transfer used to transfer audio, video, or similar data without delays. In this specification, isochronous transfer is also treated as realtime communication, from the perspective that data transfer is guaranteed to be completed within a given time interval.

Meanwhile, the secondary communication is communication that is irregularly executed between some of the nodes in a node group included on the local network. For example, the secondary communication may be delivery of application patches, file transfers, and other non-realtime communication that is comparatively resistant to latency, but which demands high throughput.

Figure 1:
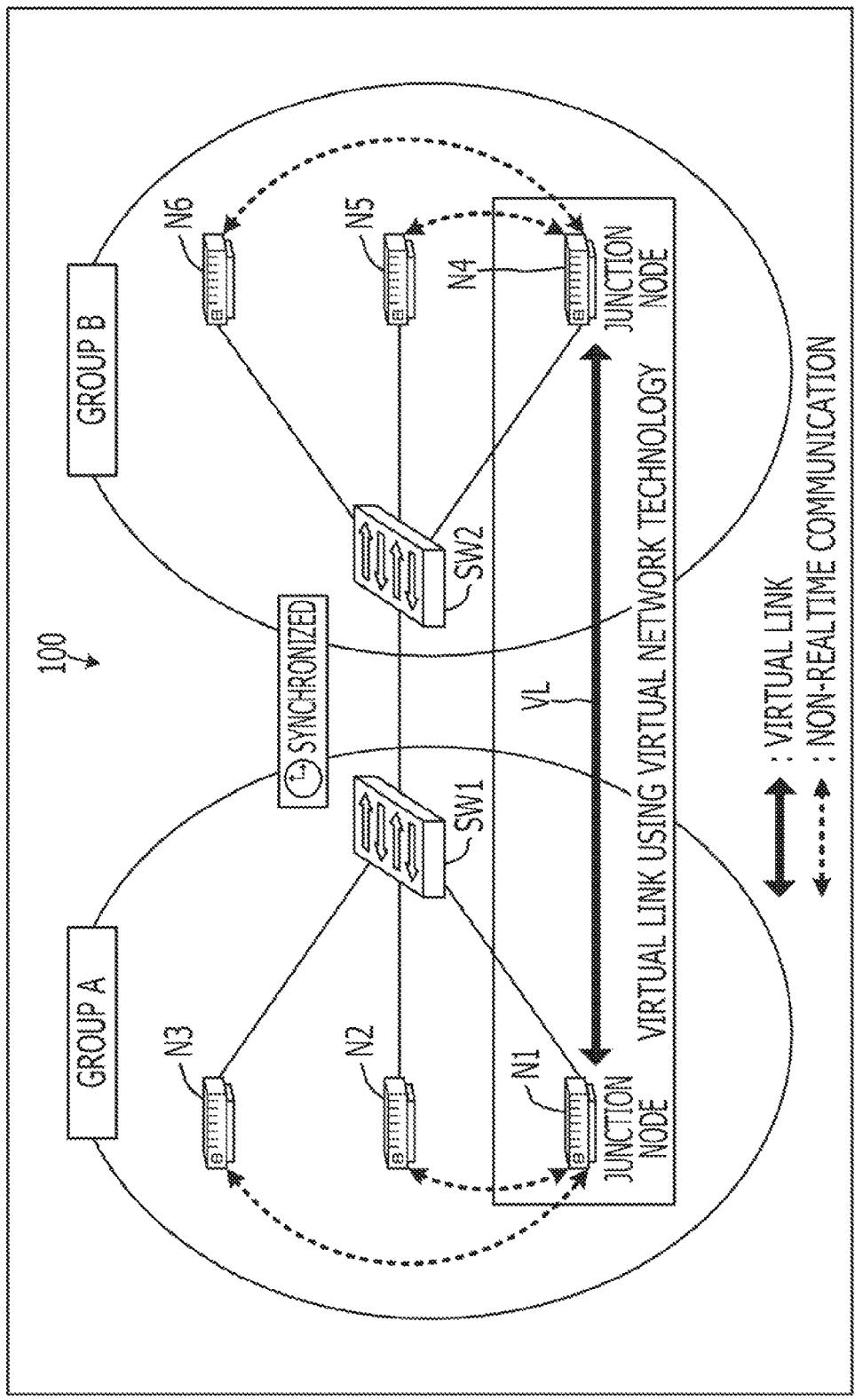
FIG. 1 illustrates one embodiment of a communication technique.

FIG. 1 illustrates one embodiment of the communication technique. In FIG. 1, the local network 100 is configured to include groups of nodes N1 to N6 as well as switches SW1 and SW2.

(1) The nodes directly connected to the individual switches SW1 and SW2 are grouped together. Herein, a group A is formed by the nodes N1 to N3 directly connected to the switch SW1, while a group B is formed by the nodes N4 to N6 directly connected to the switch SW2.

(2) In each group A and B, there is disposed a junction node for relaying secondary communication with nodes belonging to the other group A or B. Herein, the node N1 is disposed as the junction node for group A, while the node N4 is disposed as the junction node for group B. Hereinafter, an embodiment of the communication technique will be described while focusing on the group A junction node N1 from among the junction nodes N1 and N4.

(3) The junction node N1 uses virtual network technology to establish a virtual link connecting the junction nodes N1 and N4 (hereinafter referred to as the virtual link VL). The virtual link VL is used to relay secondary communication between nodes belonging to different groups A and B (such as between nodes N2 and N5, for example).

As a more specific example, the junction node N1 may receive data related to secondary communication from node N2 of group A, which is destined for node 5 of group B. Upon receiving the data, the junction node N1 transmits the data to the junction node N4 via the virtual link VL. Having been transmitted from the junction node N1 to the junction node N4, the data is then transmitted from the junction node N4 to node N5.

Herein, the junction node N1 takes the received data group related to secondary communication, successively designates each data block as outgoing data for (6) below, and stores the data in a buffer of the junction node N1. As a result, once the transmission task is launched, the junction node N1 sends out the data on the local network 100 in the order in which the data was stored in the buffer.

(4) On the basis of the transmission capabilities of the local network 100, the junction node N1 computes the required time t required to transmit the data sequence that has been designated as outgoing data since the start time of the periodically executed transmission task up until the current time. In other words, the junction node N1 estimates the time required to send out the data sequence currently stored in the buffer over the local network 100.

(5) The junction node N1 determines whether or not the time equivalent to the current time plus the required time t will match the start time of the primary communication periodically executed between any of the nodes in the plurality of nodes N1 to N6 (such as between nodes N2 and N5, for example). Herein, all nodes N1 to N6 are synchronized with a fixed time interval.

(6) On the basis of the determination results, the junction node N1 designates outgoing data from among the received data related to secondary communication. An example of designating outgoing data will be later described using FIG. 2.

(7) The junction node N1 transmits the data successively designated as outgoing data to the junction node N4 via the virtual link VL. More specifically, the junction node N1 launches the transmission task, reads out the data sequence in the buffer in the order in which the data was stored, and sends out the data over the local network 100.

Figure 2:
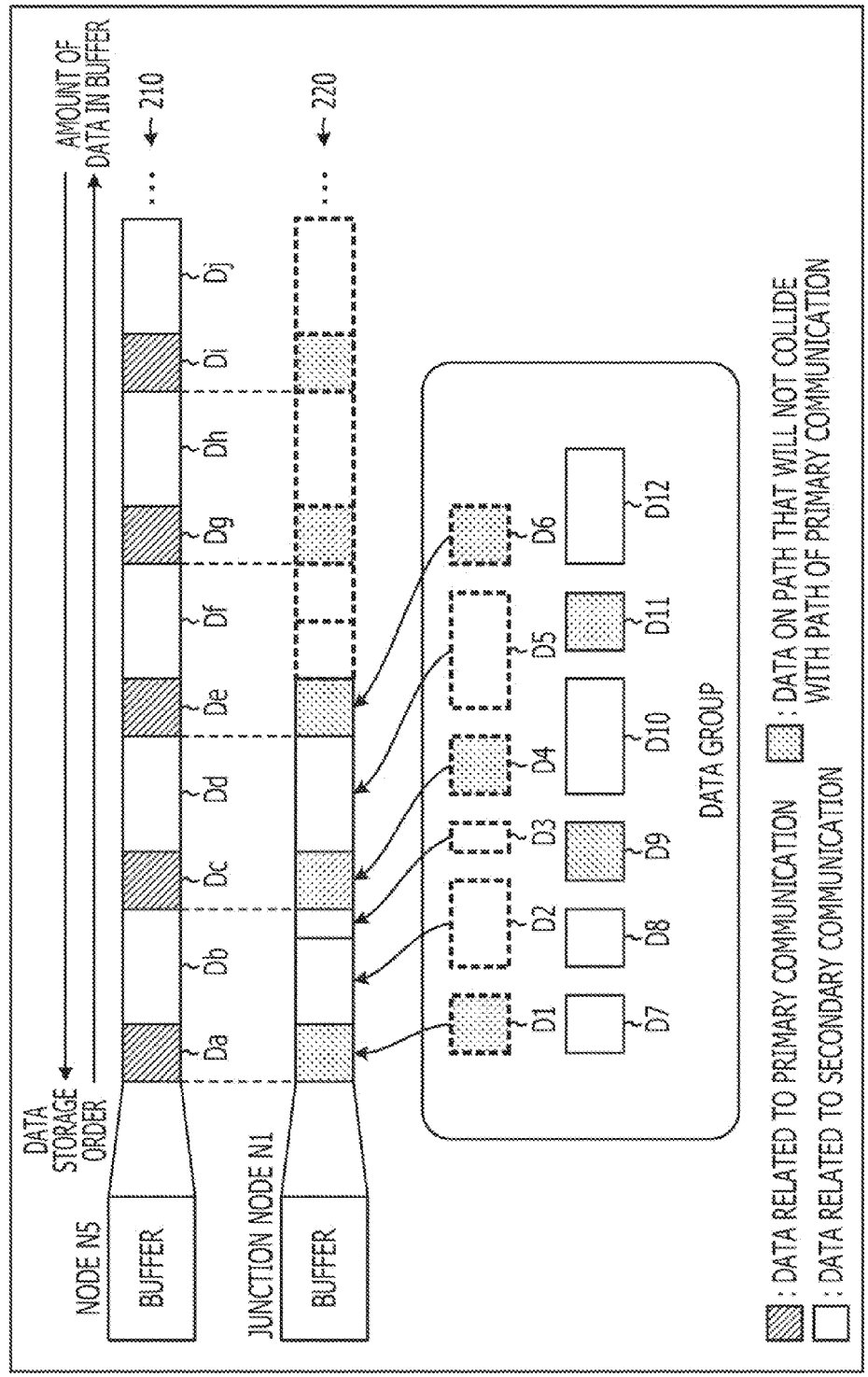
FIG. 2 summarizes an example of designating outgoing data.

FIG. 2 summarizes an example of designating outgoing data. Herein, an example of designating outgoing data in the junction node N1 will be described. In FIG. 2, the data D1 to D12 are a data group related to secondary communication that has been received at the junction node N1. In addition, node N5 in group B is herein described by way of example as the source of the primary communication executed between some of the nodes N1 to N6.

In FIG. 2, the data sequence 210 represents the data sequences Da to Dj stored in the buffer of node N5. Once the transmission task of node N5 is launched, these data sequences Da to Dj are read out from the buffer in their stored order (data Da, data Db, . . . ), and sent out over the local network 100. As a result, the data Da, Dc, De, Dg, and Di related to primary communication are sent out over the local network 100 at a fixed interval.

In the above (6) of the communication technique, when there is a match with the primary communication start time, data (such as the data D1, for example) on a path that will not collide with the primary communication path is designated as outgoing data from among the data group D1 to D12 (data sequence 220). In contrast, if there is no match with the primary communication start time in the above (6), then arbitrary data (such as the data D2, for example) is designated as outgoing data from among the data group (data sequence 220).

In this way, in this communication technique, data on paths that will not collide with the primary communication path is successively designated as outgoing data. In so doing, collisions between the primary and secondary communication are avoided. At this point, if the data sequence 120 is rearranged before being stored in the buffer so as to not collide with the primary communication, then the data sequence can be matched with the primary communication start times, and control of the transmission timings becomes unnecessary.

(System Configuration of Network System 300)

Figure 3:
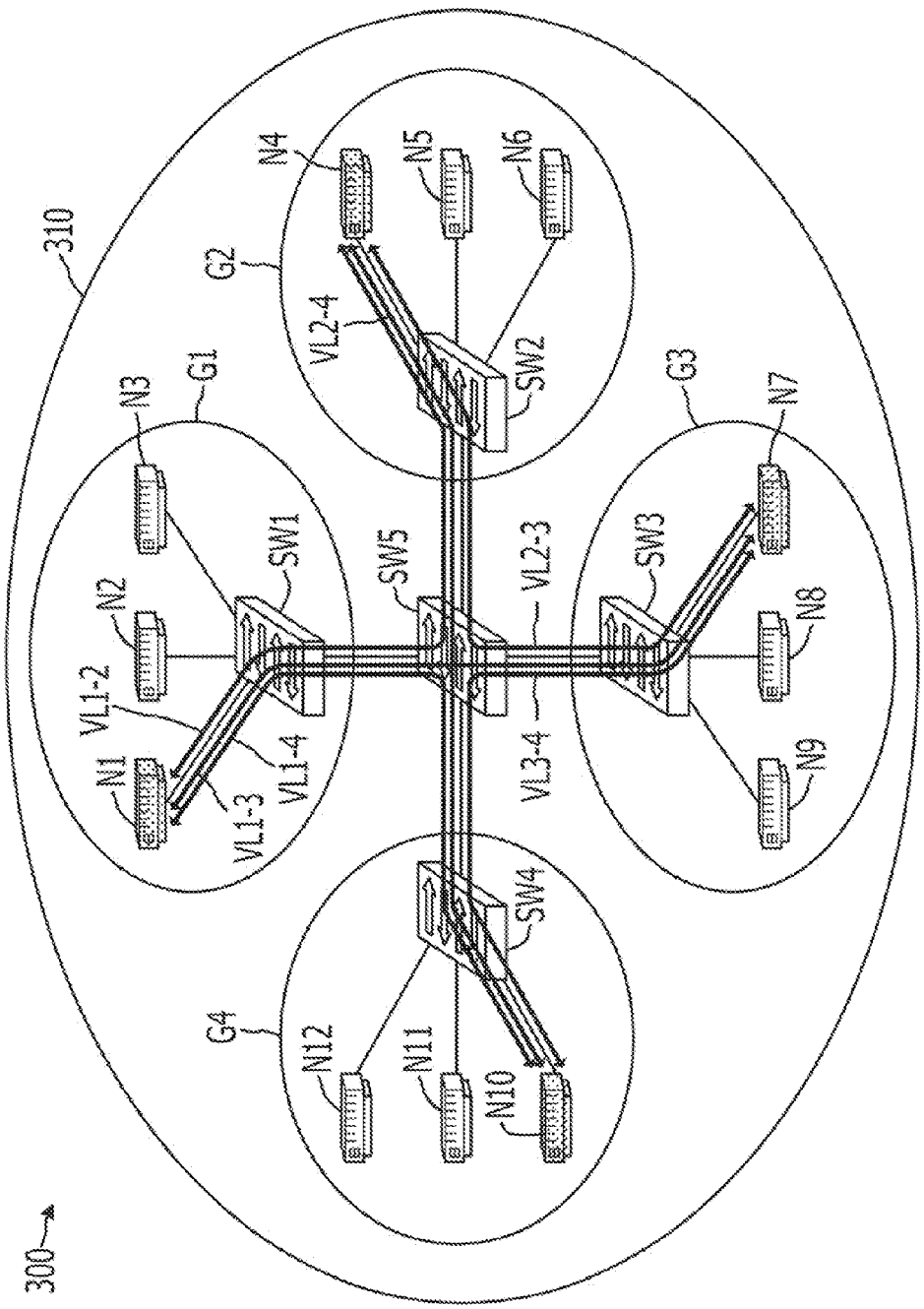
FIG. 3 illustrates a first system configuration of a network system.

Next, a system configuration of a network system 300 in accordance with an embodiment will be described. FIG. 3 illustrates a first system configuration of a network system. In the network system 300, nodes N1 to N12 and switches SW1 to SW5 are communicably connected via a local area network (LAN) or similar network 310.

Herein, the nodes N1 to N12 are communication apparatus having communication functions (realtime communication and non-realtime communication). For example, the nodes N1 to N12 may be devices such as sensors, actuators, or electric control units (ECUs) mounted onboard an automobile, robot, or other machine.

The switches SW1 to SW5 are relay apparatuses having functions for relaying data between nodes. Upon receiving data, the switches SW1 to SW5 forward the data to one of the nodes N1 to N12 in accordance with a physical address specified as the destination.

In the network system 300, groups G1 to G4 are formed by the nodes directly connected to the individual switches SW1 to SW4. More specifically, a group G1 is formed by the nodes N1 to N3 directly connected to the switch SW1, while a group G2 is formed by the nodes N4 to N6 directly connected to the switch SW2. In addition, a group G3 is formed by the nodes N7 to N9 directly connected to the switch SW3, while a group G4 is formed by the nodes N10 to N12 directly connected to the switch SW4.

Furthermore, in the network system 300, junction nodes N1, N4, N7, and N10 for relaying non-realtime communication between groups are provided in each of the groups G1 to G4. In addition, in the network system 300, virtual links VL connecting each of the junction nodes have been respectively established.

In the description hereinafter, "virtual link Vx-y" shall represent the virtual link leading from the junction node for the group Gx to the junction node for the group Gy. Also, "virtual VLx-y" and "virtual link VLy-x" shall represent the same virtual link.

More specifically, the virtual links VL1-2, VL1-3, and VL1-4 have been established between the junction node N1 for the group G1 and the junction nodes N4, N7, and N10 for the groups G2 to G4. The virtual links VL2-3 and VL2-4 have been established between the junction node N4 for the group G2 and the junction nodes N7 and N10 for the groups G3 and G4. The virtual link VL3-4 has been established between the junction node N7 for the group G3 and the junction node N10 for the group G4.

(Hardware Configuration of Nodes N1 to N12)

Figure 4:
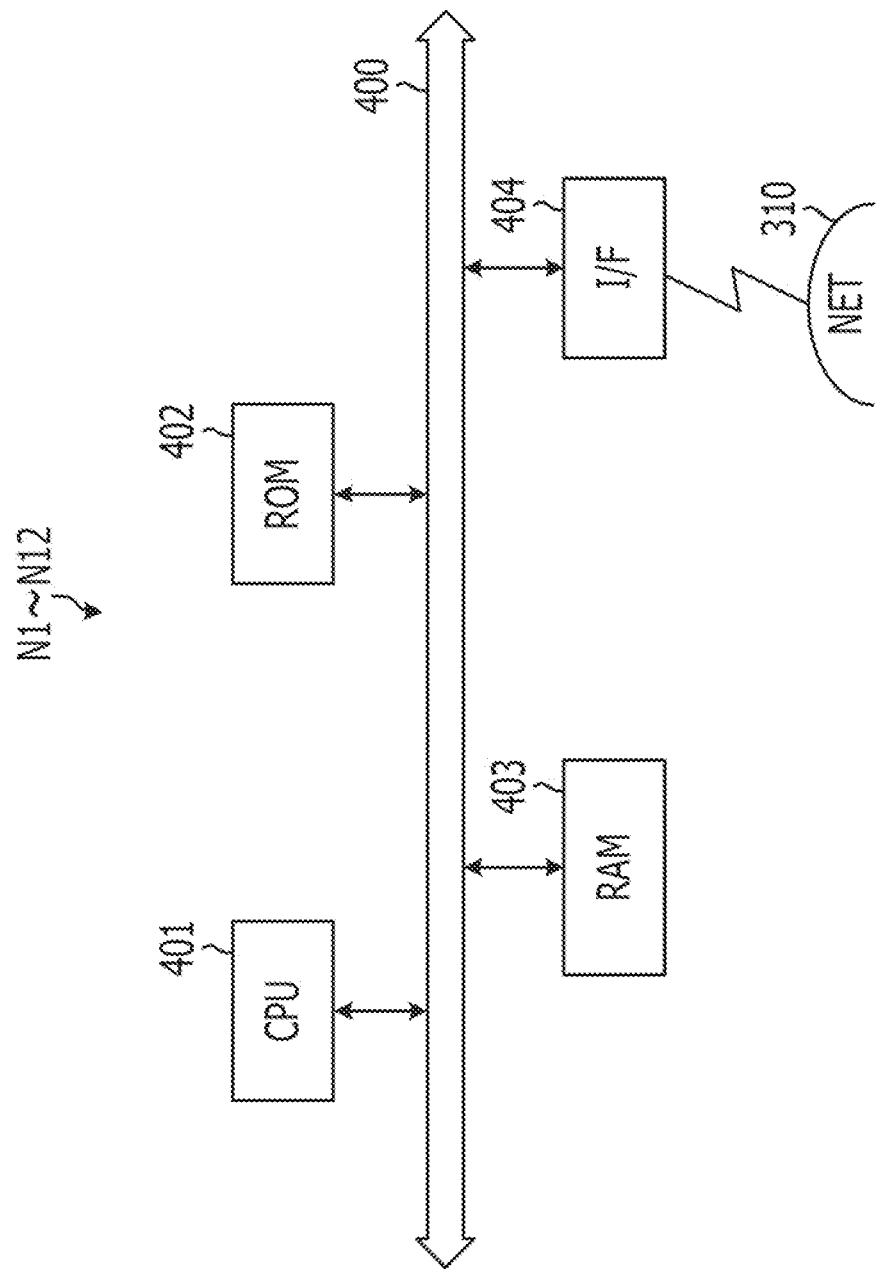
FIG. 4 is a block diagram illustrating an exemplary hardware configuration of a node.

Next, the hardware configuration of the nodes N1 to N12 illustrated in FIG. 3 will be described. FIG. 4 is a block diagram illustrating an exemplary hardware configuration of a node. In FIG. 4, each node N1 to N12 is provided with a central processing unit (CPU) 401, read-only memory (ROM) 402, random access memory (RAM) 403, and an interface (I/F) 404. Additionally, the components are respectively connected to each other by a bus 400.

Herein, the CPU 401 administers overall control of each node N1 to N12. The ROM 402 stores programs, such as a boot program, for example. The RAM 403 is used as a work area for the CPU 401. The I/F 404 is connected to a LAN or other network 310 via a communication line, and is connected to other apparatuses via this network 310. In addition, the I/F 404 acts an interface between the network 310 and the internal components of the node, and controls the input and output of data with respect to external apparatuses.

In addition to the above components, the nodes N1 to N12 may also be provided with components such as a magnetic disk drive, a magnetic disk, an optical disc drive, and an optical disc, for example. Herein, a magnetic disk drive controls the reading and writing of data with respect to a magnetic disk, following controls by the CPU 401.

A magnetic disk stores data that has been written thereto under control of a magnetic disk drive. An optical disc drive controls the reading and writing of data with respect to an optical disc, following controls by the CPU 401. An optical disc stores data that has been written thereto under control of an optical disc drive, and allows a computer to retrieve data that has been stored on the optical disc.

(Stored Contents of Various Tables)

Next, the stored contents of tables 500 and 600 used by the nodes N1 to N12 will be described. These tables 500 and 600 are stored in a storage apparatus, such as the ROM 402 or RAM 403 illustrated in FIG. 4. In the description hereinafter, the nodes N1 to N12 will be collectively referred to as the node N unless a particular node is to be specified.

<Stored Contents of Address Table>

Figure 5:
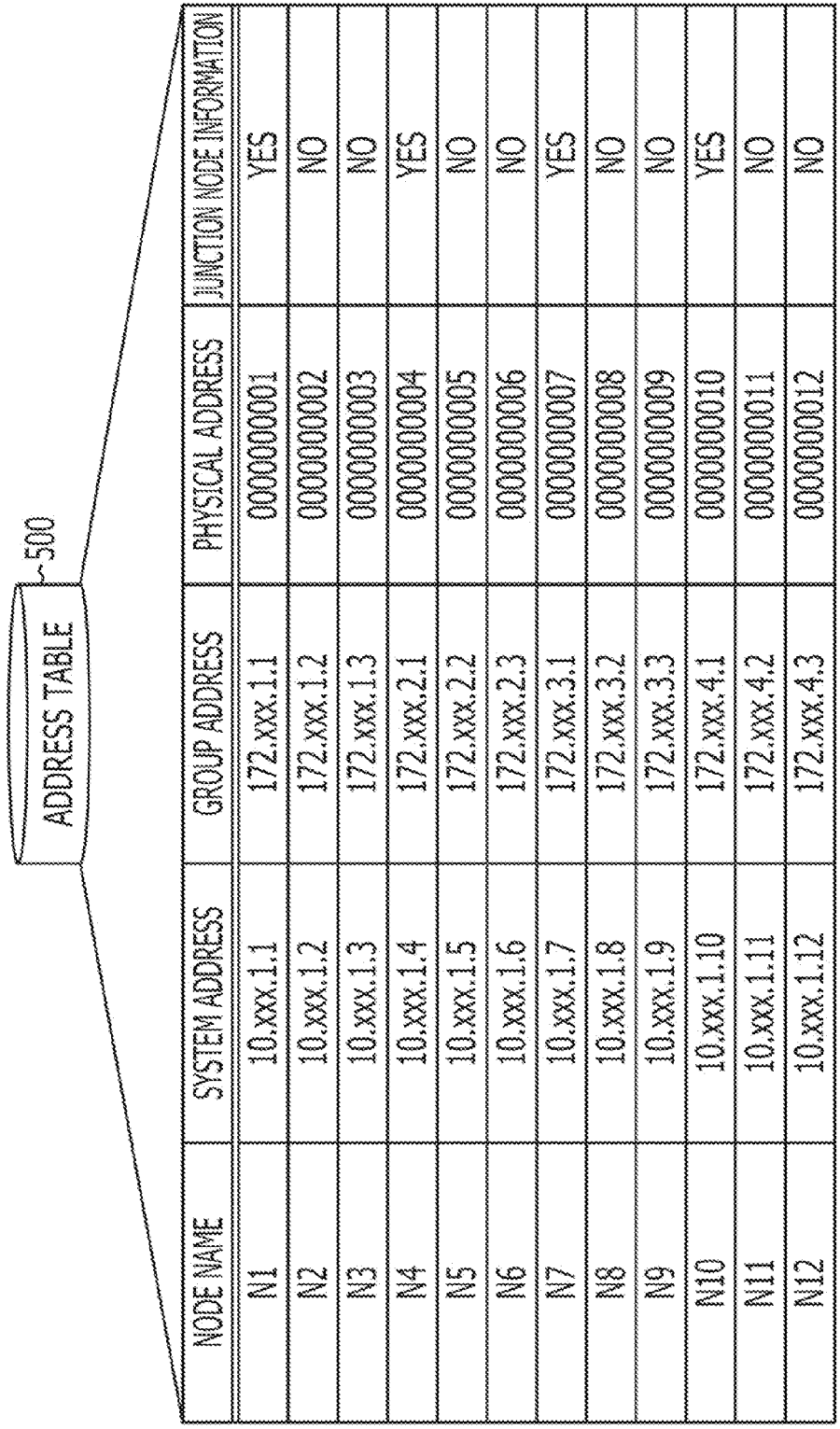
FIG. 5 illustrates one example of the stored contents of an address table.

FIG. 5 illustrates one example of the stored contents of an address table. In FIG. 5, the address table 500 includes the following fields for each of the nodes N1 to N12: the node name, the system address, the group address, the physical address, and junction node information.

The node name refers to the name of each of the nodes N1 to N12 used for the sake of explanation in the present specification. The system address refers to an address for each of the nodes N1 to N12 that is uniquely determined on a system-wide level in the network system 300. The physical address refers to a built-in address for each I/F 404 connected to the network 310. The physical address may be the Ethernet™ media access control (MAC) address, for example.

The group address refers to an address for each of the nodes N1 to N12 that is uniquely determined within each group G1 to G4 in the network system 300. Herein, each group address contains four sets of numbers delimited by dots (.) (such as 172.xxx.1.1, for example). Of these, the first through the third sets of numbers are a group ID that identifies one of the groups G1 to G4. The fourth set of numbers (such as 1, for example) is a node ID that identifies a node N within a group.

Junction node information refers to information that identifies a node N as a junction node. Herein, the value "Yes" is set in the junction node information field of nodes N that function as junction nodes, whereas the value "No" is set in the junction node information field of nodes N that function as group nodes. Herein, junction nodes are determined by preset information or a selection algorithm such that one (or more) junction node is guaranteed to exist within each of the groups G1 to G4.

<Stored Contents of Group Identification Table>

Figure 6:
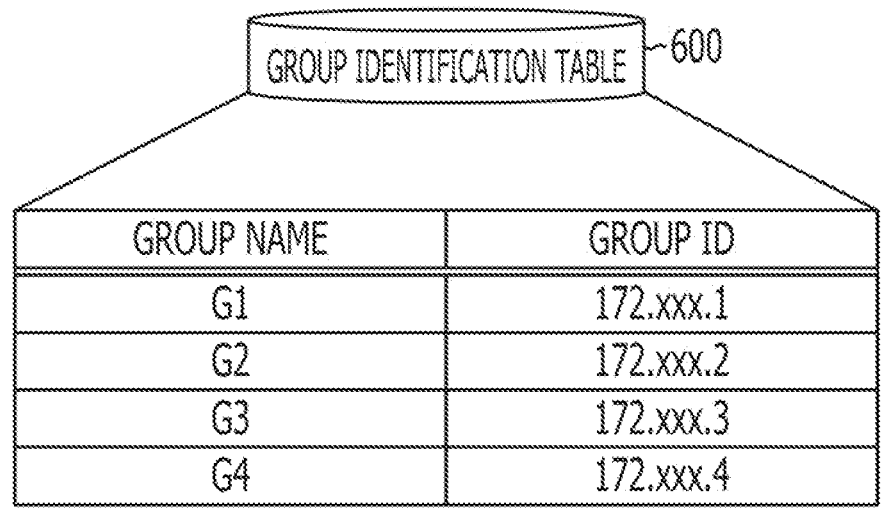
FIG. 6 illustrates one example of the stored contents of a group identification table.

FIG. 6 illustrates one example of the stored contents of a group identification table. In FIG. 6, the group identification table 600 associates and stores a group name and a group ID for each of the groups G1 to G4.

The group name refers to the name of each of the groups G1 to G4 used for the sake of explanation in the present specification. The group ID refers to an identifier that identifies each of the groups G1 to G4. The group ID may be the network part of an Internet Protocol (IP) address, for example. Herein, the upper part of the group address (such as 172.xxx.1, for example) corresponds to the group ID.

Among the nodes N1 to N12 on the network 310, the nodes N that relay non-realtime communication are hereinafter labeled the junction nodes JN, while the remaining nodes N excepting the junction nodes JN are labeled the group nodes GN. The functional configuration of the junction nodes JN will now be described.

(Functional Configuration of Junction Nodes JN)

Figure 7:
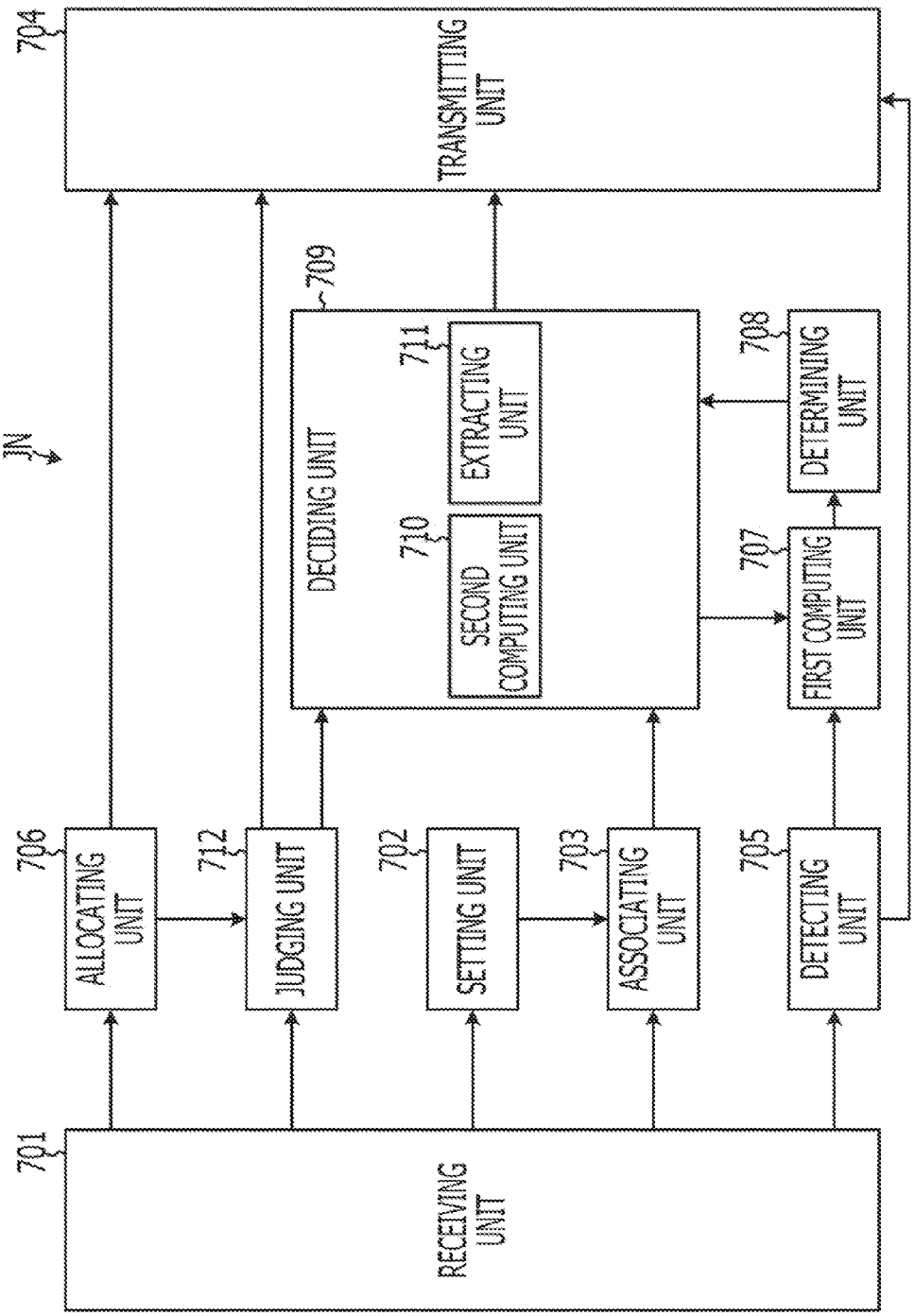
FIG. 7 is a block diagram illustrating the functional configuration of a junction node.

FIG. 7 is a block diagram illustrating the functional configuration of a junction node. In FIG. 7, each junction node JN is configured to include a receiving unit 701, a setting unit 702, an associating unit 703, a transmitting unit 704, a detecting unit 705, an allocating unit 706, a first computing unit 707, a determining unit 708, a deciding unit 709, a second computing unit 710, an extracting unit 711, and a judging unit 712.

More specifically, the function of each function unit (i.e., the receiving unit 701 to the judging unit 712) is realized by the CPU 401 illustrated in FIG. 4 executing a program stored in a storage apparatus such as the ROM 402 or the RAM 403, or alternatively, by the I/F 404, for example. Herein, unless otherwise specified, the processing results from each function unit (i.e., the receiving unit 701 to the judging unit 712) are stored in a storage apparatus such as the RAM 403.

Hereinafter, when describing specific examples of the respective function units (i.e., the receiving unit 701 to the judging unit 712) of a junction node JN, the node N1 within the network system 300 will be assumed as the junction node JN. In addition, realtime communication and non-realtime communication are herein described by way of example as the primary and secondary communication conducted between the nodes N and coexisting in the network system 300.

First, the receiving unit 701 receives various data. The various data may include data related to non-realtime communication (hereinafter referred to as non-realtime data), synchronization packets, and realtime communication stream rate allocation requests and stream rate allocation responses, for example. Synchronization packets, stream rate allocation requests, and stream rate allocation responses will be later described in detail.

As a more specific example, from among the plurality of groups of nodes N, the receiving unit 701 may receive non-realtime data from a group node GN included in a first group of nodes N, which is destined for a group node GN included in another group of nodes N. Herein, a group of nodes N refers to a collection of nodes N directly connected to one of the individual switches SW1 to SW4 illustrated in FIG. 3. Also, the first group of nodes N refers to the group of nodes N that includes the current node N (i.e., the node N provided with the receiving unit 701 receiving the non-realtime data in this case). The data structure of the non-realtime data will now be described.

Figure 8:
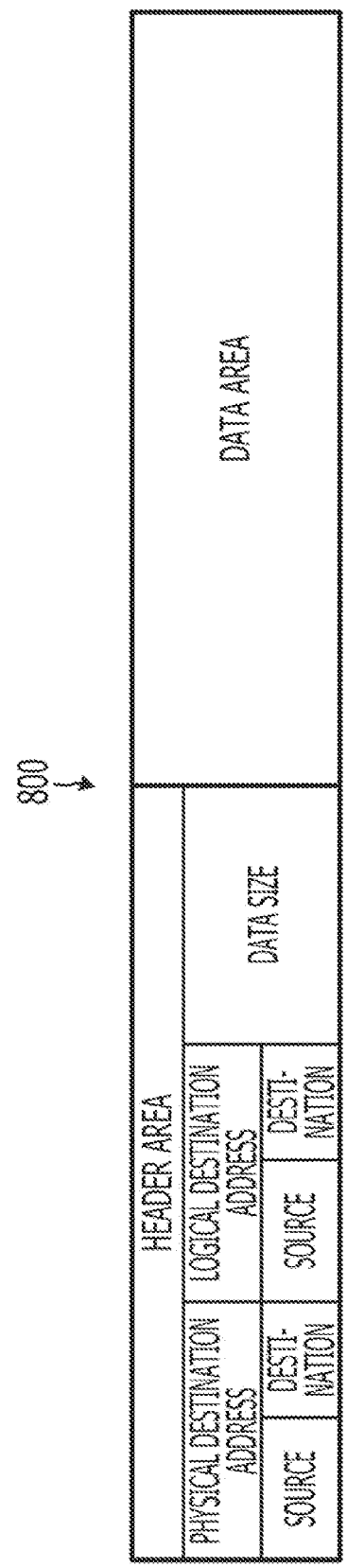
FIG. 8 illustrates one example of the data structure of non-realtime data.

FIG. 8 illustrates one example of the data structure of non-realtime data. In FIG. 8, the non-realtime data 800 includes a header area and a data area. In the header area, the physical destination address, the logical destination address, and the data size are set. In the data area, data exchanged by applications in each node N is written.

The physical destination address refers to a physical address indicating the next immediate transmission destination of the non-realtime data. The logical destination address refers to a logical address indicating the final destination of the non-realtime data. The logical destination address may be a group address used only within each of the groups G1 to G4, for example. The physical destination address and the logical destination address fields also contain a physical address and a logical address indicating the transmission source of the non-realtime data. The data size refers to the length of the non-realtime data.

Returning to FIG. 7, the setting unit 702 sets a path to another node N selected from another group of nodes N. Herein, the other node N is another junction node JN selected from another group of nodes N. A path refers to a virtual link VL on the virtual network established over the network 310.

As a more specific example, the setting unit 702 may first reference the junction node information in the address table 500 illustrated in FIG. 5, and specify the other junction nodes N4, N7, and N10. The setting unit 702 may then set one of the virtual links VL1-2 to VL1-4 connecting the current node N1 with the other junction nodes N4, N7, and N10 (see FIG. 3).

The virtual links (i.e., paths) are used to collectively transfer non-realtime data between nodes N belonging to different groups G. The virtual links VL may be established by using an existing virtual network technology, such as an overlay network. However, since the specific techniques for establishing the virtual links VL are existing technology, further description thereof is herein omitted. In addition, the virtual links established between the current node N and the other junction nodes JN may be managed by using the destination/forwarding address association table 900 illustrated in FIG. 9, for example.

Figure 9:
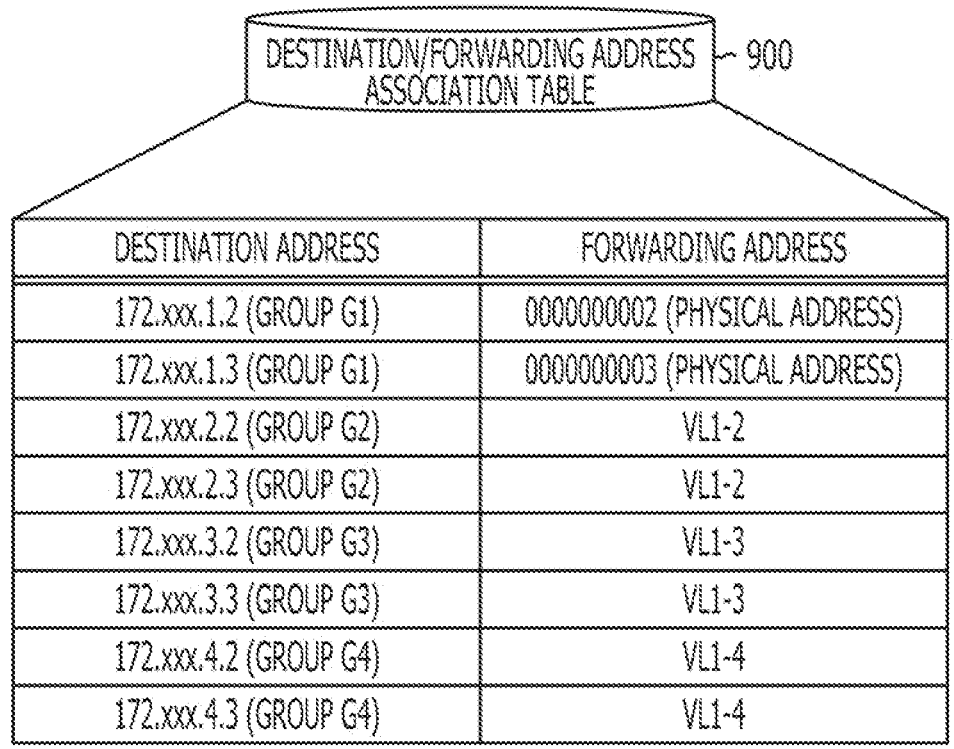
FIG. 9 illustrates a first specific example of a destination/forwarding address association table.

FIG. 9 illustrates a first specific example of a destination/forwarding address association table. In FIG. 9, the destination/forwarding address association table 900 associates and stores destination addresses and forwarding addresses. The destination address refers to the logical destination address specified as the final destination of the non-realtime data. Herein, the group addresses of the nodes N are set as destination addresses.

The forwarding address herein refers to a forwarding address for the non-realtime data. Herein, one of the following is set as the forwarding address: the physical address of a group node GN within the current group G, or a virtual link VL (more specifically, its identifier) to the junction node JN of another group G. Herein, the destination/forwarding address association table 900 is created according to the following sequence, and stored in a storage apparatus such as the RAM 403, for example.

First, the setting unit 702 references the address table 500, and sets the group addresses of group nodes GN from among the nodes N1 to N12 as destination addresses in the destination/forwarding address association table 900. Next, the setting unit 702 references the group identification table 600 illustrated in FIG. 6, and specifies a group G from the destination addresses of the respective group nodes GN.

If the specified group G is the current group G, then the setting unit 702 references the address table 500, and sets the physical address corresponding to the destination address as the forwarding address. In contrast, if the specified group G is another group G, then the setting unit 702 references the address table 500, and specifies the junction node JN of that group G. Subsequently, the setting unit 702 sets the virtual link VL to the specified junction node N as the forwarding address.

Returning to FIG. 7, the associating unit 703 associates non-realtime data received from group nodes GN in the current group G with an established virtual link VL. As a more specific example, the associating unit 703 references the queue association table 1000 illustrated in FIG. 10, and inserts the received non-realtime data into a corresponding data queue. The stored contents of the queue association table 1000 will now be described.

FIG. 10 illustrates one example of the stored contents of a queue association table. In FIG. 10, the queue association table 1000 associates and stores forwarding addresses and queue IDs. The forwarding address refers to a forwarding address for non-realtime data. The queue ID refers to an identifier that identifies a data queue holding non-realtime data.

For example, in the case where the destination address (i.e., the logical destination address) of received non-realtime data is 172.xxx.3.3, the forwarding address becomes VL1-3 (see the destination/forwarding address association table 900). Consequently, the received non-realtime data is inserted into the data queue Q4 (see the queue association table 1000).

Returning to FIG. 7, the receiving unit 701 again receives non-realtime data from another junction node JN via a virtual link VL. As a more specific example, the receiving unit 701 may receive non-realtime data from the junction node N4 of the group G2 via the virtual link VL1-1.

In addition, the associating unit 703 associates the non-realtime data received from the other junction node JN with a virtual link VL. As a more specific example, the associating unit 703 may reference the queue association table 1000, and insert the received non-realtime data into a corresponding data queue.

For example, in the case where the destination address (i.e., the logical destination address) of the non-realtime data is 172.xxx.1.2, the forwarding address becomes 0000000002 (see the destination/forwarding address association table 900). Consequently, the non-realtime data is inserted into the data queue Q1 (see the queue association table 1000).

The transmitting unit 704 takes non-realtime data successively designated as outgoing data from among the received data group, and transmits the data other junction nodes JN via virtual links VL. In addition, the transmitting unit 704 takes non-realtime data successively designated as outgoing data from among the received data group, and transmits the data to group nodes GN in the current group G.

Herein, the data group may be the collection of non-realtime data held in the data queues Q1 to Q5, for example. In addition, the non-realtime data designated as outgoing data is data that has been successively decided on by the deciding unit 709 hereinafter described, and which is being stored in a buffer. The buffer may be the outgoing buffer of a network interface card (NIC), for example.

The non-realtime data transmission process of the transmitting unit 704 is periodically executed at a fixed time interval (such as every 5 milliseconds (ms), for example). More specifically, a transmission task is launched at a fixed time interval, and non-realtime data being stored in the buffer is read out in its stored order and then sent out over the network 310.

In other words, the transmitting unit 704 may receive non-realtime data from a group node GN in the current group G, and forward the data to another junction node JN. In addition, the transmitting unit 704 may receive non-realtime data from another junction node JN, and forward the data to a group node GN in the current group G. Thus, in the description hereinafter, the non-realtime data transmission process will be referred to as the non-realtime data forwarding process.

The detecting unit 705 detects a cycle start time for synchronizing the time among the nodes N1 to N12 on the network 310. More specifically, the detecting unit 705 measures the elapsed time since the current node N was launched, and detects the time after a preset cycle interval has elapsed as the cycle start time. Hereinafter, the cycle for synchronizing the time will be referred to as the cycle C1.

As a result of detecting the cycle start time of the cycle C1, the transmitting unit 704 transmits a synchronization packet to the other junction nodes JN. As a more specific example, the transmitting unit 704 may transmit a synchronization packet to the other junction nodes N4, N7, and N10, wherein each synchronization packet has an attached identifier for synchronizing the time. In so doing, time can be synchronized among the junction nodes JN in the network system 300.

In addition, the transmitting unit 704 transmits a synchronization packet to the group nodes GN in the current group G. In so doing, all nodes N within the group G can be synchronized. However, if a synchronization packet is received from another junction node JN before the detecting unit 705 detects the cycle start time of the cycle C1, then the time at which the synchronization packet was received is detected as the cycle start time of the cycle C1.

Herein, the non-realtime data forwarding process is periodically executed, using the cycle start time of the cycle C1 as a basis. However, the time interval at which the non-realtime data forwarding process is executed is less than or equal to the cycle interval of the cycle C1. Hereinafter, the cycle of the non-realtime data forwarding process will be referred to as the cycle C2.

On the basis of the transmission capabilities of the network 310, the allocating unit 706 allocates stream rates for non-realtime communication to the virtual links VL. Herein, the transmission capabilities of the network 310 may refer to the capacity (i.e., the communication rate per unit time) of the physical links of the network system 300. The stream rate refers to the amount of data that can be transmitted per unit time.

As a more specific example, the allocating unit 706 may compute the stream rates to allocate to each virtual link VL by dividing the physical link capacity by the number of virtual links VL. By way of example, assume that the physical link capacity of the network system 300 is 12 Mbps. In this case, the stream rate allocated to each of the virtual links VL1-1 to VL1-3 becomes 12/3=4 Mbps.

In so doing, the physical link capacity can be uniformly allocated to the virtual links VL1-1 to VL1-3. However, in the case where stream rates are also allocated for the purpose of realtime communication among the nodes N, the total allocable stream rate becomes a value equal to the physical link capacity minus the stream rate allocated to realtime communication.

Figure 11:
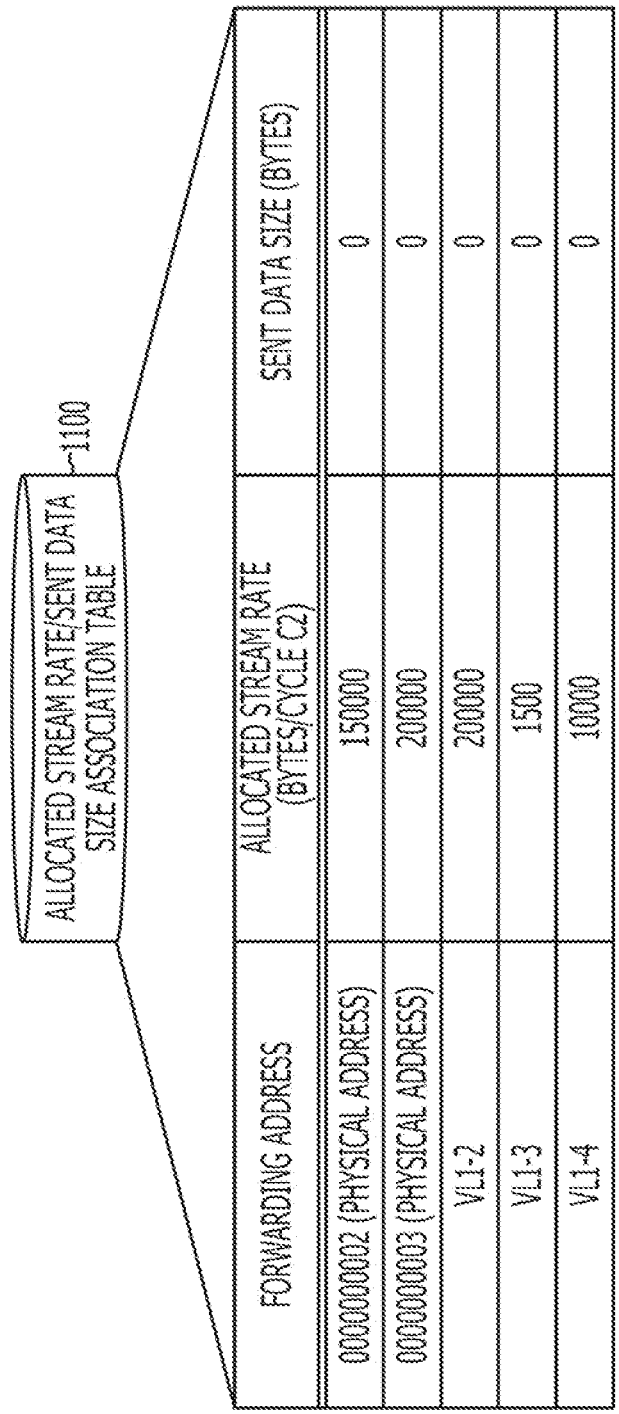
FIG. 11 illustrates one example of the stored contents of an allocated stream rate/sent data size association table.

The stream rate allocation results may be stored in the allocated stream rate/sent data size association table 1100 illustrated in FIG. 11, for example. Additionally, the stream rates allocated to the virtual links VL are transmitted to the other junction nodes JN by the transmitting unit 704. Furthermore, if stream rates allocated to the virtual links VL are received from another junction node JN by the receiving unit 701, then the received stream rates are stored in the allocated stream rate/sent data size association table 1100, and the stored contents of the table are updated.

In addition, on the basis of the transmission capabilities of the network 310, the allocating unit 706 allocates stream rates for non-realtime communication to the group nodes GN in the current group G. As a more specific example, the allocating unit 706 may compute the stream rates to allocate to each group node GN by dividing the physical link capacity by the number of group nodes GN in the group G1. The stream rate allocation results may be stored in the allocated stream rate/ sent data size association table 1100 illustrated in FIG. 11, for example.

FIG. 11 illustrates one example of the stored contents of an allocated stream rate/sent data size association table. In FIG. 11, the allocated stream rate/sent data size association table 1100 includes an allocated stream rate and a sent data size for each forwarding address.

Herein, the forwarding address refers to a forwarding address for non-realtime data. The allocated stream rate refers to the stream rate (bytes/cycle C2) of non-realtime data transmittable per unit time (in this case, per cycle C2). The sent data size refers to the data size (bytes) of data that has been transmitted to a particular forwarding address. Herein, the sent data size is set by keeping a cumulative count of data sizes of the non-realtime data successively designated as outgoing data by the deciding unit 709 hereinafter described.

The above allocating unit 706 may also be configured to allocate stream rates to each virtual link VL (or each group node GN) according to the communication conditions between the current node N and the other junction nodes JN (or the group nodes GN). In so doing, the allocated stream rates can be controlled according to dynamically changing communication conditions. However, since techniques for controlling allocated stream rates according to communication conditions are existing technology, detailed description of such techniques is herein omitted.

On the basis of the transmission capabilities of the network 310, the first computing unit 707 computes the required time t required to transmit a data sequence that has been successively designated as outgoing data since the cycle start time of the non-realtime data forwarding process up until the current time. Herein, a data sequence refers to a collection of non-realtime data being stored in a buffer. The required time t may also refer to the amount of time required to send out a data sequence over the network 310, for example.

As a more specific example, the first computing unit 707 may compute the required time t by using the following Eq. 1. In Eq. 1, t is the required time in seconds (s) required to transmit a data sequence, R is the communication rate per unit time in bits per second (bps) over the network 310, and d is the data size in bits (b) of the data sequence.

$$t=d/R \qquad (1)$$

Herein, assume that the communication rate R of the network 310 is 1 Gbps, and that the data size d of the data sequence is 100 Kb. In this case, the required time t required to transmit the data sequence is t=100 Kb/1 Gbps=100 μs.

The determining unit 708 determines whether or not the time after the computed required time has elapsed matches the cycle start time of realtime communication periodically executed between any of the nodes N among the plurality of groups of nodes. Herein, realtime communication between nodes N is periodically executed on a time interval that is shorter than that of the forwarding process (such as 125 μs, for example), using the cycle start time of the cycle C1 (or the cycle C2) as a basis. Hereinafter, the cycle of realtime communication will be referred to as the cycle C3.

As a more specific example, the determining unit 708 may take an elapsed time T1 to be the time elapsed since the cycle start time of the cycle C1 (or the cycle C2) until the current time, and take an elapsed time T2 to be the elapsed time T1 plus the required time t. The determining unit 708 may then determine whether or not the elapsed time T2 is equal to 0 or a constant multiple of the cycle C3.

Herein, T2=0 entails that both T1=0 and t=0, or in other words, represents the case where the current time is a cycle start time of the cycle C2, and where no data has yet been designated as outgoing data. In other words, the determining unit 708 determines whether or not the hypothetical time equal to the current time plus the required time t would match the cycle start time of the realtime communication.

If the elapsed time T2 is equal to 0 or a constant multiple of the cycle C3, then the determining unit 708 determines that the elapsed time T2 matches the cycle start time of the realtime communication. In contrast, if the elapsed time T2 is not equal to 0 or a constant multiple of the cycle C3, then the determining unit 708 determines that the elapsed time T2 does not match the cycle start time of the realtime communication.

Figure 12:
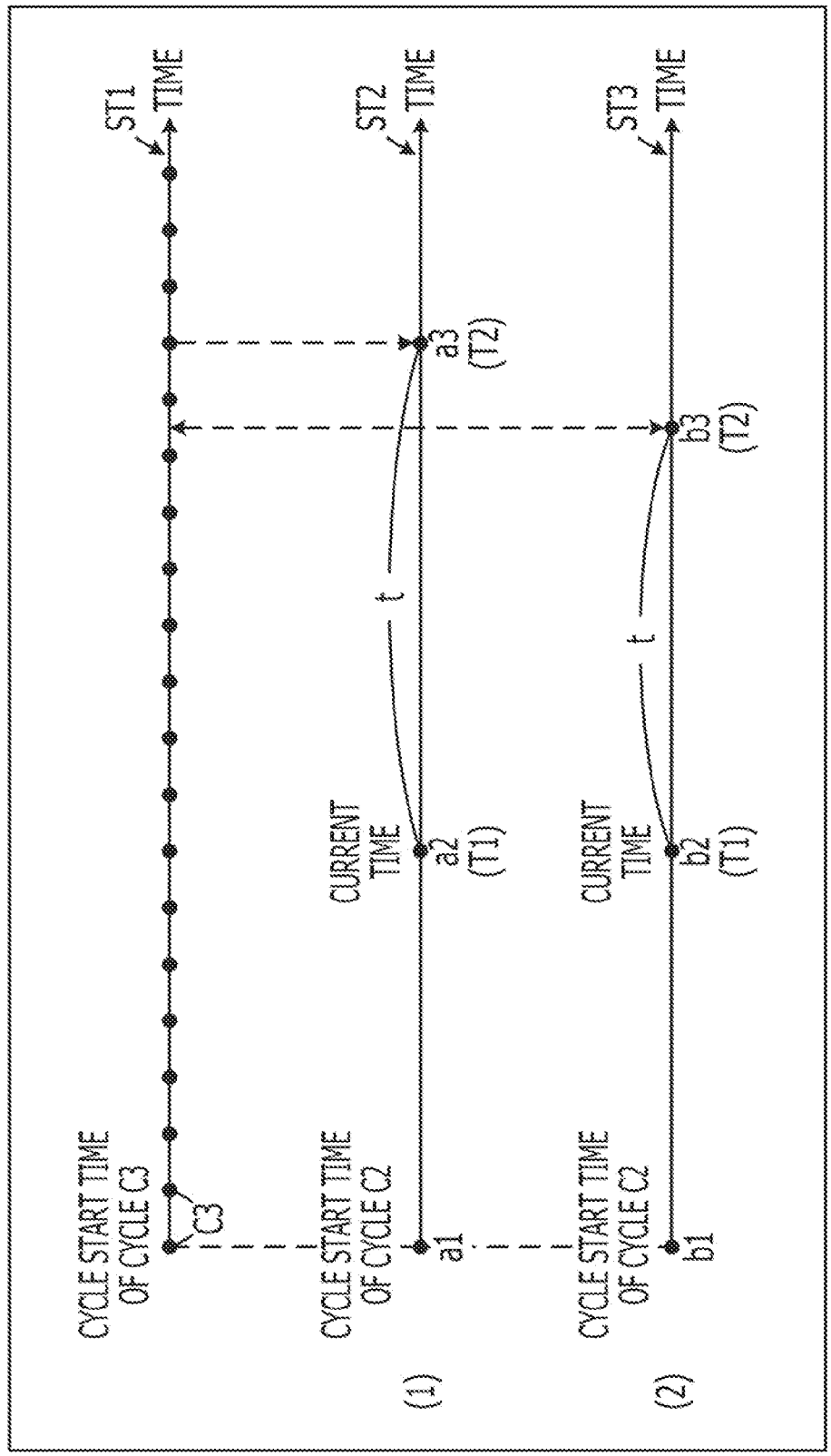
FIG. 12 illustrates an example of determining a match with the cycle start time of realtime communication.

FIG. 12 illustrates an example of determining a match with the cycle start time of realtime communication. In FIG. 12, each point on the time axis ST1 represents a cycle start time of the realtime communication periodically executed among the nodes N. In addition, on the time axes ST2 and ST3, the points a1 and b1 represent cycle start times of the cycle C2, the points a2 and b2 represent the current time (i.e., the elapsed time T1), and the points a3 and b3 represent the times after the required time t has elapsed since the current time (i.e., the elapsed time T2).

In (1) of FIG. 12, the time a3 (i.e., the current time a2 plus the required time t) matches the cycle start time of the realtime communication. In this case, the determining unit 708 determines that the time equal to the current time plus the required time t matches the cycle start time of the realtime communication.

In (2) of FIG. 12, the time b3 (i.e., the current time b2 plus the required time t) does not match the cycle start time of the realtime communication. In this case, the determining unit 708 determines that the time equal to the current time plus the required time t does not match the cycle start time of the realtime communication.

Returning to FIG. 7, on the basis of the determination results, the deciding unit 709 decides on non-realtime data to be designated as outgoing data from among the received data group. Herein, the data group refers to a collection of non-realtime data received from group nodes GN or other junction nodes JN.

Hereinafter, examples of specific processing operations executed by the deciding unit 709 will be described for each of the following cases: (i) when it is determined that the elapsed time T2 matches the cycle start time of the realtime communication; and (ii) when it is determined that the elapsed time T2 does not match the cycle start time of the realtime communication.

First, in the case of (i), the deciding unit 709 specifies paths from among the virtual links VL established with the other junction nodes JN, wherein the specified paths are path that collide with the paths for realtime communication among the nodes N. Herein, a path that collides with a realtime communication path refers to a virtual link VL established with the junction node JN of the group G containing the node N set as the destination of the realtime communication. Herein, the nodes N that are set as the sources and destinations of realtime communication may be specified from the realtime communication allocated stream rate table 1300 illustrated in FIG. 13, for example.

FIG. 13 illustrates a first example of the stored contents of a realtime communication allocated stream rate table. In FIG. 13, the realtime communication allocated stream rate table 1300 includes the following fields: the allocation ID, the allocated stream rate, the source address, and the destination address. By setting information in each field, realtime communication information 1300-1 to 1300-4 is stored as records.

Herein, the allocation ID refers to an identifier that identifies the allocated stream rate that has been allocated to the realtime communication between particular nodes N. The allocated stream rate refers to the stream rate (in bytes) that has been allocated to the realtime communication between particular nodes N. The source address refers to the address of the node N that acts as the source of the realtime communication. Herein, the source address is represented in the form of the system address and the group address of the node N that acts as the source of the realtime communication.

The destination address refers to the address of the node N that acts as the destination of the realtime communication. Herein, the destination address is represented in the form of the system address and the group address of the node N that acts as the destination of the realtime communication. Specific processing operations for creating the realtime communication allocated stream rate table 1300 will be described later.

As a more specific example, the deciding unit 709 may reference the realtime communication allocated stream rate table 1300, and specify the group addresses of the nodes N that act as destinations of realtime communication. In this case, the group addresses 172.xxx.1.2, 172.xxx.2.2, 172.xxx.3.2, and 172.xxx.3.3 of the nodes N2, N5, N8, and N9 are specified.

Subsequently, the deciding unit 709 references the destination/forwarding address association table 900, and specifies forwarding addresses from the specified group addresses. In this case, the forwarding addresses 0000000002 (physical address), VL1-2, and VL1-3 are specified. The forwarding addresses (i.e., paths) specified at this point are forwarding addresses (i.e., paths) that will collide with the realtime communication among the nodes N.

In other words, the forwarding addresses 0000000002 (physical address), VL1-2, and VL1-3 are forwarding addresses to which non-realtime data transmission should be restricted, in order to avoid collisions with the realtime communication among the nodes N. Thus, the transmittable destination list 1400 illustrated in FIG. 14 may be used to manage non-realtime data transmission availability for each forwarding address, for example.

Figure 14:
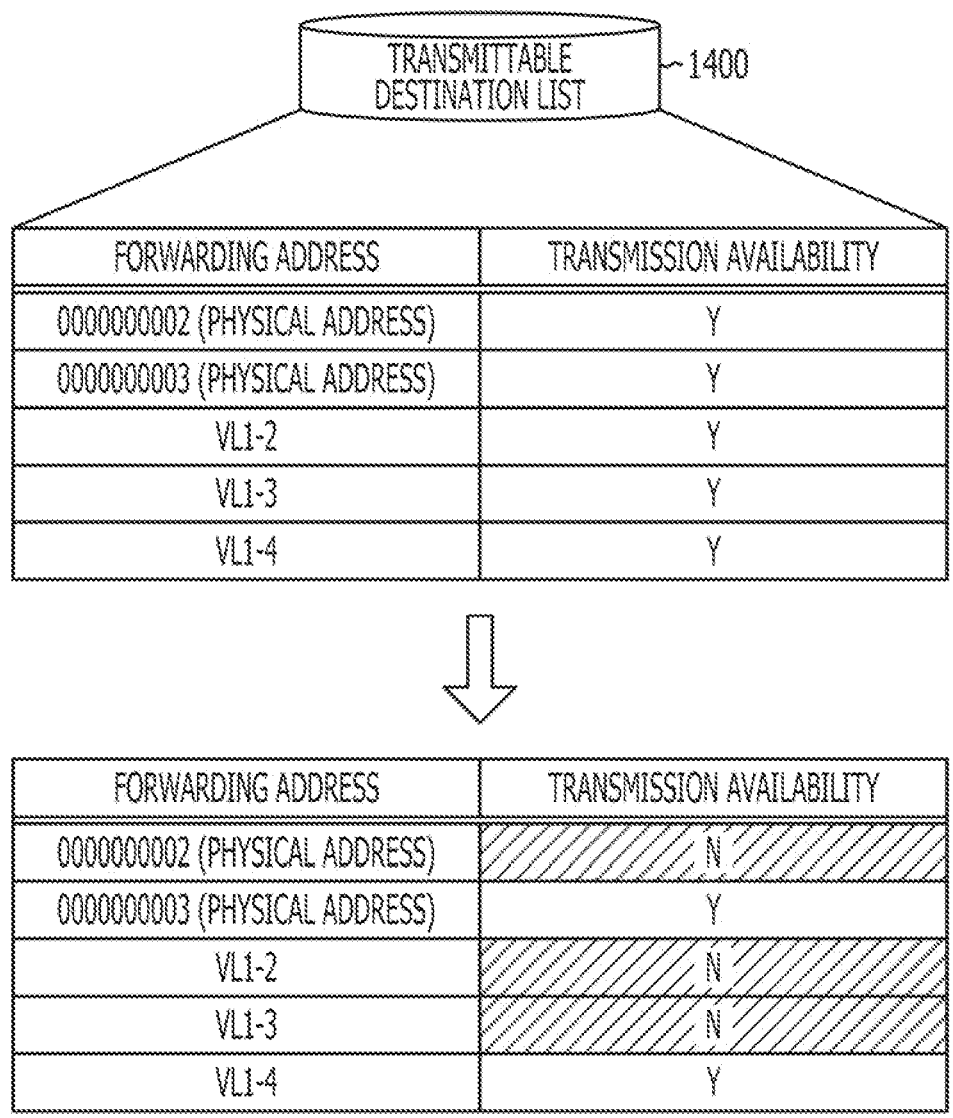
FIG. 14 illustrates a first example of the stored contents of a transmittable destination list.

FIG. 14 illustrates a first example of the stored contents of a transmittable destination list. In FIG. 14, the transmittable destination list 1400 includes the transmission availability for each forwarding address. The transmission availability is information indicating whether or not non-realtime data is transmittable to a particular forwarding address.

A transmission availability of "Y" indicates that non-realtime data is transmittable to the corresponding forwarding address. In contrast, a transmission availability of "N" indicates that non-realtime data is not transmittable to the corresponding forwarding address. By default, the transmission availability is "Y".

As a more specific example, the deciding unit 709 may change the transmission availability from "Y" to "N" for the forwarding addresses that would collide with the realtime communication among the nodes N. In this case, the transmission availability is changed from "Y" to "N" for the specified forwarding addresses 0000000002 (physical address), VL1-2, and VL1-3.

Subsequently, the second computing unit 710 computes the total allocated stream rate by summing the allocated stream rates that have been allocated to the realtime communication among the nodes N. As a more specific example, the second computing unit 710 may compute the total allocated stream rate by referencing the realtime communication allocated stream rate table 1300, and summing the allocated stream rates corresponding to the allocation IDs R1 to R4. In this case, the total allocated stream rate becomes 5800 bytes.

Then, from among the received data group, the extracting unit 711 extracts the non-realtime data with forwarding addresses having a transmission availability of "Y". As a more specific example, the extracting unit 711 may reference the transmittable destination list 1400, and specify the forwarding addresses with a transmission availability of "Y". In this case, the forwarding addresses 0000000003 (physical address) and VL1-4 are specified.

Next, the extracting unit 711 references the queue association table 1000, and specifies the data queues for the specified forwarding addresses. In this case, the data queue Q2 for the forwarding address 0000000003 (physical address) and the data queue Q5 for the forwarding address VL1-4 are specified. Subsequently, the extracting unit 711 extracts the non-realtime data from the specified data queues (in this case, the data queues Q2 and Q5).

The deciding unit 709 designates the extracted non-realtime data as outgoing data. At this point, if non-realtime data having a data size larger than the total allocated stream rate for realtime communication is designated as outgoing data, then there is a possibility that the data will collide realtime communication in the next cycle C3. Consequently, the non-realtime data designated as outgoing data from among the extracted non-realtime data by the deciding unit 709 is non-realtime data whose data size is less than or equal to the computed total allocated stream rate.

However, there is a possibility of data loss if the amount of non-realtime data to be transmitted exceeds the allocated stream rate that can be transmitted per unit time (see FIG. 11). For this reason, non-realtime data destined for forwarding addresses that would exceed their allocated stream rates is not designated as outgoing data by the deciding unit 709.

Meanwhile, if no outgoing non-realtime data exists, then the deciding unit 709 designates invalid data as outgoing data. This outgoing data will be discarded at the switch SW1 directly connected to the current node N. An Ethernet PAUSE frame with a pause time of 0 s may be used as the invalid data, for example.

At this point, the deciding unit 709 may also be configured such that the amount of invalid data designated as outgoing data is equal to the total allocated stream rate for realtime communication. Herein, it should be appreciated that the case where no outgoing non-realtime data exists occurs when there is no non-realtime data to be extracted, or alternatively, when there is no non-realtime data among the extracted non-realtime data whose data size is less than or equal to the total allocated stream rate.

Meanwhile, if there exists a plurality of non-realtime data having a data size less than or equal to the total allocated stream rate, then the deciding unit 709 may designate as outgoing data the non-realtime data with the largest data size from among the plurality of non-realtime data. In so doing, non-realtime data can be efficiently transmitted.

Next, in the case of (ii), the second computing unit 710 computes the remaining time between the time equal to the current time plus the required time t, and the cycle start time of realtime communication. As a more specific example, the second computing unit 710 may first compute the elapsed time T3 between the cycle start time of the cycle C1 (or the cycle C2) and the next cycle start time of realtime communication that will occur after the current time.

The second computing unit 710 may then compute the remaining time until the cycle start time of realtime communication by subtracting the elapsed time T2 from the elapsed time T3 thus computed. Herein, the elapsed time T2 is an elapsed time equal to the elapsed time T1 plus the required time t, wherein the elapsed time T1 is the time from the cycle start time of the cycle C1 (or the cycle C2) until the current time.

In addition, the second computing unit 710 computes the amount of data that can be transmitted in the remaining time on the basis of the transmission capabilities of the network 310. As a more specific example, the second computing unit 710 may compute the amount of data that can be transmitted in the remaining time by using the following Eq. 2. In Eq. 2, X is the amount of data (b) that can be transmitted in the remaining time, (T3−T2) is the remaining time (s), and R is the communication rate per unit time (bps) over the network 310.

$$X = (T3 - T2) \times R \quad (2)$$

Herein, assume that the remaining time (T3−T2) is 20 μs, and that the communication rate R over the network 310 is 1 Gbps. In this case, the amount of data X than can be transmitted in the remaining time (T3−T2) is X=20 μs×1 Gbps=20 Mb.

Subsequently, the extracting unit 711 extracts non-realtime data from the non-realtime data group, wherein the extracted data has a data size less than or equal to the amount of data that can be transmitted in the remaining time. As a more specific example, the extracting unit 711 may extract arbitrary non-realtime data from the data queues Q1 to Q5, wherein the extracted data is less than or equal to the amount of data that can be transmitted in the remaining time.

The deciding unit 709 designates the extracted non-realtime data as outgoing data. At this point, if there exists a plurality of extracted non-realtime data, then the deciding unit 709 may designate as outgoing data the non-realtime data with the largest data size from among the plurality of data.

Meanwhile, if no outgoing non-realtime data exists, then the deciding unit 709 designates invalid data as outgoing data. This outgoing data will be discarded at the switch SW1 directly connected to the current node N. At this point, the deciding unit 709 may also be configured such that the amount of invalid data designated as outgoing data is equal to the amount of data that can be transmitted in the remaining time.

The non-realtime data designated as outgoing data is stored in a buffer. Then, once the transmission task of the transmitting unit 704 is launched, the non-realtime data stored in the buffer is sent out in stored order over the network 310.

In this way, by restricting the transmission of non-realtime data that would collide with realtime communication, collisions between realtime communication and non-realtime communication can be avoided. In the case where there exists a plurality of realtime communication executed within the network system 300, the non-realtime data designated as outgoing data is decided on while taking into account the respective start times of the realtime communication.

The decision results thus decided are reflected in the allocated stream rate/sent data size association table 1100 illustrated in FIG. 11. More specifically, in the allocated stream rate/sent data size association table 1100, the sent data sizes are updated for the forwarding addresses corresponding to the non-realtime data that was designated as outgoing data. In further detail, the data sizes of the non-realtime data that was designated as outgoing data are added to the current sent data sizes.

In addition, the receiving unit 701 receives realtime communication stream rate allocation requests from group nodes GN or other junction nodes JN. A stream rate allocation request contains the requested stream rate for realtime communication, the source address, and the destination address. Herein, the requested stream rate refers to the stream rate that is requested for the purpose of realtime communication among the nodes N.

The source address refers to the address from which data related to realtime communication (hereinafter referred to as realtime data) originates, and may be the system address of the source node N, for example. The destination address refers to the address to which the realtime data is destined, and may be the system address of the destination node N, for example. In the description hereinafter, the source of the stream rate allocation request (i.e., a group node GN or another junction node JN) will be referred to as the forwarding source.

As a result of receiving a realtime communication stream rate allocation request, the judging unit 712 judges whether or not the requested stream rate is allocable. As a more specific example, the judging unit 712 may first reference the realtime communication allocated stream rate table 1300, and compute the sum of the allocated stream rates that correspond to a destination address that matches the destination address contained in the stream rate allocation request (hereinafter referred to as the total node-allocated stream rate s)

The judging unit 712 then computes a tentative node-allocated stream rate s' by adding the requested stream rate contained in the stream rate allocation request to the total node-allocated stream rate s. Subsequently, the judging unit 712 judges whether or not the tentative node-allocated stream rate s' is less than or equal to the maximum data size $F_{MAX}$ that can be transmitted during the realtime communication cycle C3.

If the tentative node-allocated stream rate s' is greater than the maximum data size $F_{MAX}$, then the transmitting unit 704 transmits a stream rate allocation response to the forwarding source, which indicates that the requested stream rate is not allocable. In other words, by avoiding situations where the data size transmitted to a realtime communication destination node N exceeds the maximum data size $F_{MAX}$ that can be transmitted during the cycle C3, loss of data on the network 310 may be prevented.

In contrast, if the tentative node-allocated stream rate s' is less than or equal to the maximum data size $F_{MAX}$, then the judging unit 712 references the address table 500, and specifies the group address that corresponds to the destination system address contained in the stream rate allocation request. The judging unit 712 then references the group identification table 600, and specifies the group G that corresponds to the specified group address.

Subsequently, the judging unit 712 judges whether or not the specified group G is the current group G. If the specified group G is the current group G, then the judging unit 712 references the realtime communication allocated stream rate table 1300, and computes the sum of the realtime communication allocated stream rates whose source is another group G and whose destination is the current group G (hereinafter referred to as the total allocated stream rate S).

Subsequently, the judging unit 712 then computes a tentative allocated stream rate S' by adding the requested stream rate to the total allocated stream rate S. The judging unit 712 then judges whether or not the tentative allocated stream rate S' is less than or equal to the maximum data size $F_{MAX}$ that can be transmitted during the realtime communication cycle C3.

If the tentative allocated stream rate S' is greater than the maximum data size $F_{MAX}$, then the transmitting unit 704 transmits a stream rate allocation response to the forwarding source, which indicates that the requested stream rate is not allocable. In other words, by avoiding situations where the data size transmitted to the current group G exceeds the maximum data size $F_{MAX}$ that can be transmitted during the cycle C3, loss of data on the network 310 may be prevented.

In contrast, if the tentative allocated stream rate S' is less than or equal to the maximum data size $F_{MAX}$, then the judging unit 712 judges that the requested stream rate is allocable to realtime communication. The judging unit 712 then sets the requested stream rate, the source address, and the destination address contained in the stream rate allocation request in the realtime communication allocated stream rate table 1300, and registers the new realtime communication information as a record. Herein, the group addresses of the source and destination nodes N are specified from the address table 500 by using the source and destination system addresses. Lastly, the transmitting unit 704 transmits a stream rate allocation response to the forwarding source, which indicates that the requested stream rate is allocable.

In contrast, if the specified group G is another group G, then the judging unit 712 references the realtime communication allocated stream rate table 1300, and computes the total allocated stream rate S for the realtime communication whose source is the current group G and whose destination is another group G. Herein, the specified group G refers to the group G that was specified from the group address corresponding to the destination system address contained in the stream rate allocation request.

Subsequently, the judging unit 712 computes a tentative allocated stream rate S' by adding the requested stream rate to the total allocated stream rate S. The judging unit 712 then judges whether or not the tentative allocated stream rate S' is less than or equal to the maximum data size $F_{MAX}$ that can be transmitted during the realtime communication cycle C3.

If the tentative allocated stream rate S' is greater than the maximum data size $F_{MAX}$, then the transmitting unit 704 transmits a stream rate allocation response to the forwarding source, which indicates that the requested stream rate is not allocable. In other words, by avoiding situations where the data size transmitted from the current group G to another group G exceeds the maximum data size $F_{MAX}$ that can be transmitted during the cycle C3, loss of data on the network 310 may be prevented.

In contrast, if the tentative allocated stream rate S' is less than or equal to the maximum data size $F_{MAX}$, then the transmitting unit 704 references the address table 500, and transmits a stream rate allocation request to the junction node JN of the specified group G. If the receiving unit 701 subsequently receives a stream rate allocation response from the junction node JN indicating that the requested stream rate is not allocable, then the transmitting unit 704 transmits a stream rate allocation response to the forwarding source, which indicates that the requested stream rate is not allocable.

In contrast, if the receiving unit 701 receives a stream rate allocation response from the junction node JN indicating that the requested stream rate is allocable, then the judging unit 712 judges that the requested stream rate is allocable to realtime communication. The judging unit 712 then takes the requested stream rate, the source address, and the destination address contained in the stream rate allocation request in the realtime communication allocated stream rate table 1300, and registers the new realtime communication information as a record.

In so doing, it becomes possible to avoid situations where a stream rate that exceeds the transmission capabilities of the network 310 is allocated in response to a stream rate allocation request for realtime communication. As a result, the discarding of data en route by the switches SW1 to SW4 or other apparatus may be prevented, and quality of service may be ensured for realtime communication.

(Functional Configuration of Group Node GN)

Figure 15:
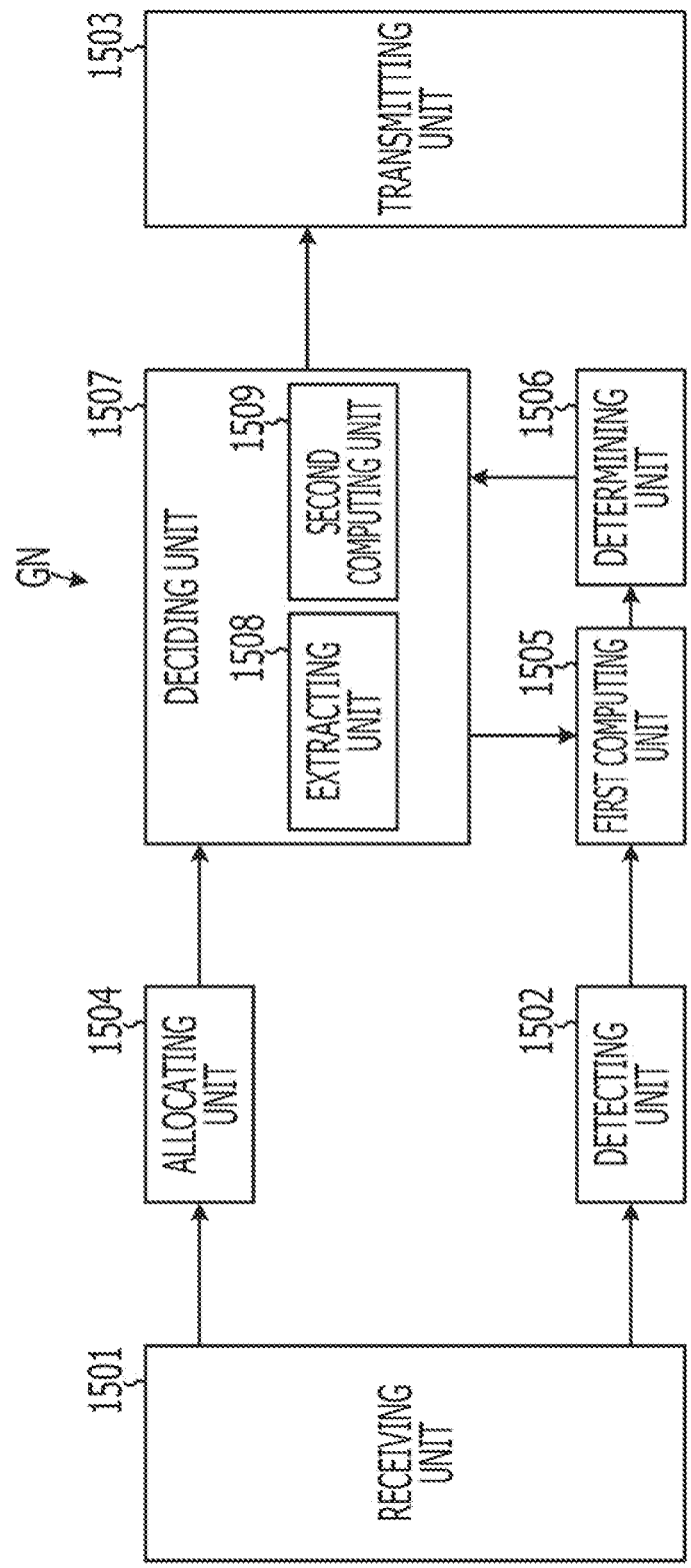
FIG. 15 is a block diagram illustrating the functional configuration of a group node.

The functional configuration of a group node GN will now be described. FIG. 15 is a block diagram illustrating the functional configuration of a group node. In FIG. 15, the group node GN is configured to include a receiving unit 1501, a detecting unit 1502, a transmitting unit 1503, an allocating unit 1504, a first computing unit 1505, a determining unit 1506, a deciding unit 1507, an extracting unit 1508, and a second computing unit 1509.

More specifically, the function of each function unit (i.e., the receiving unit 1501 to the second computing unit 1509) is realized by the CPU 401 illustrated in FIG. 4 executing a program stored in a storage apparatus such as the ROM 402, the RAM 403, a magnetic disk, or an optical disc, or alternatively, by the I/F 404, for example. Hereinafter, when describing specific examples of the respective function units (i.e., the receiving unit 1501 to the second computing unit 1509) of a group node GN, the node N2 within the network system 300 will be assumed as the group node GN.

The receiving unit 1501 receives various data. The various data may include synchronization packets, stream rate allocation results for non-realtime communication, stream rate allocation results for realtime communication, realtime communication stream rate allocation responses, realtime data, and non-realtime data, for example.

The detecting unit 1502 detects a cycle start time for synchronizing the time among the nodes N1 to N12 on the network 310. More specifically, upon receiving a synchronization packet from a junction node JN, the detecting unit 1502 detects the time at which the synchronization packet was received as the cycle start time of the cycle C1.

The transmitting unit 1503 transmits realtime data. As a more specific example, the transmitting unit 1503 may take realtime data successively designated as outgoing data from among a data group, and transmit the data to another group node GN. Herein, the data group may refer to the collection of realtime data and non-realtime data being held in the data queues, for example. In addition, the realtime data designated as outgoing data is data that has been successively decided on by the deciding unit 1507 hereinafter described, and which is being stored in a buffer.

The transmitting unit 1503 also transmits non-realtime data. As a more specific example, the transmitting unit 1503 may take non-realtime data successively designated as outgoing data from among the data group, and transmit the data to a junction node JN. Herein, the non-realtime data designated as outgoing data is data that has been successively decided on by the deciding unit 1507 hereinafter described, and which is being stored in a buffer.

The realtime data and non-realtime data transmission processes of the transmitting unit 1503 are periodically executed at the cycle C2, using the cycle start time of the cycle C1 as a basis. More specifically, a transmission task is launched at the time interval of the cycle C2, and realtime data or non-realtime data being stored in a buffer is read out in its stored order and then sent out over the network 310. At this point, the data sequences in the buffers may be rearranged like the data sequence 210 illustrated in FIG. 2, for example, and thus realtime data is transmitted at the time interval of the cycle C3.

Figure 16:
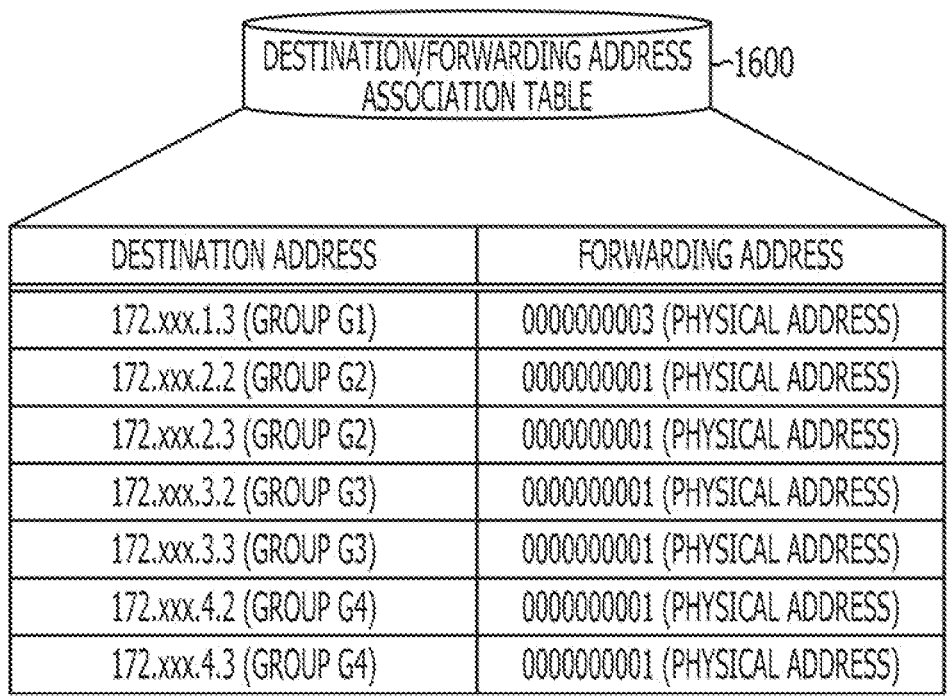
FIG. 16 illustrates a second specific example of a destination/forwarding address association table.

Herein, the destination of the non-realtime data may be set by referencing the destination/forwarding address association table 1600 illustrated in FIG. 16, for example. FIG. 16 illustrates a second specific example of a destination/forwarding address association table. In FIG. 16, the destination/forwarding address association table 1600 associates and stores destination addresses and forwarding addresses.

The destination address refers to a logical destination address specified as the final destination of the non-realtime data. Herein, the group address of a node N is set as the destination address. The forwarding address refers to a forwarding address of the non-realtime data. Herein, the physical address of a group node GN or a junction node JN is set as the forwarding address.

For example, in the case of transmitting non-realtime data to the group node N3 in the current group G1, the physical address of the group node N3 will be set as the physical destination address. In contrast, in the case of transmitting non-realtime data to the group node N5 of another group G2, the physical address of the junction node N1 will be set as the physical destination address, and the group address of the group node N5 will be set as the logical destination address.

Returning to FIG. 15, the allocating unit 1504 takes received stream rate allocation results for non-realtime communication, and allocates the stream rates to paths joining group nodes GN and junction nodes JN. As a more specific example, the allocating unit 1504 may store a stream rate allocation result in association with the physical link that joins the current node to a junction node JN.

In addition, the transmitting unit 1503 also transmits realtime communication stream rate allocation requests to a junction node JN. Herein, the realtime communication stream rate allocation request refers to a request to allocate a stream rate required for realtime communication originating from the current node N. A realtime communication stream rate allocation request contains information expressing the requested stream rate, the system address of the realtime communication source (i.e., the current node), and the system address of the realtime communication destination (i.e., another group node GN).

A stream rate allocation response may be received as a result of transmitting a realtime communication stream rate allocation request. Upon receiving a stream rate allocation response that contains information indicating that the requested stream rate is allocable, the information may be stored in a realtime communication allocated stream rate table 1700 illustrated in FIG. 17, for example. In addition, upon receiving realtime communication stream rate allocation results, the results are stored in the realtime communication allocated stream rate table 1700.

FIG. 17 illustrates a second example of the stored contents of a realtime communication allocated stream rate table. In FIG. 17, the realtime communication allocated stream rate table 1700 includes the following fields: the allocation ID, the allocated stream rate, the source address, and the destination address. By setting information in each field, realtime communication information 1700-1 is stored as a record.

The realtime communication allocated stream rate table 1700 manages realtime communication information in which the current node N acts as the source or the destination of the realtime communication. In this case, the realtime communication allocated stream rate table 1700 stores realtime communication information 1700-1 in which the node N2 (i.e., the current node) acts as the destination.

The group node GN may also be configured such that, in the case of receiving a stream rate allocation response indicating that the requested stream rate is not allocable, the group node GN autonomously judges whether or not the requested stream rate for realtime communication can be reduced. The requested stream rate for realtime communication may be reduced in cases such as when the requested stream rate for realtime communication is greater than the stream rate that is actually required, or when forwarding video or other data for which the bit rate can be lowered without problems. In such cases, the transmitting unit 1503 may re-transmit a stream rate allocation request to the junction node JN, wherein the requested stream rate has been reduced from the previously requested stream rate for realtime communication.

On the basis of the transmission capabilities of the network 310, the first computing unit 1505 computes the required time t required to transmit a data sequence that has been successively designated as outgoing data since the cycle start time of the realtime data or non-realtime data transmission process up until the current time. As a more specific example, the first computing unit 1505 may compute the required time t required to transmit a data sequence by using the earlier Eq. 1.

The determining unit 1506 determines whether or not the time equal to the current time plus the required time t computed above matches the cycle start time of realtime communication periodically executed between any of the nodes N among the plurality of groups of nodes. As a more specific example, the determining unit 1506 may take an elapsed time T1 to be the time elapsed since the cycle start time of the cycle C2 (or the cycle C1) until the current time, and take an elapsed time T2 to be the elapsed time T1 plus the required time t. The determining unit 1506 may then determine whether or not the elapsed time T2 is equal to 0 or a constant multiple of the cycle C3.

On the basis of the determination results determined above, the deciding unit 1507 decides on data to be designated as outgoing data from among the data group. Herein, the data group is the collection of realtime data and non-realtime data. As a more specific example, the deciding unit 1507 may reference the realtime communication allocated stream rate table 1700, and specify the group address of the node N set as the source of the realtime communication. In this case, the group address 172.xxx.2.3 of the node N6 is specified.

Next, the deciding unit 1507 compares the specified group address to the group address of the current node N, and determines whether or not the source of the realtime communication is the current node N. If the source is the current node N, then the deciding unit 1507 designates the leading realtime data in the data queue for the realtime communication destination as outgoing data.

Herein, the realtime communication source is not the current node N. In this case, the deciding unit 1507 references the realtime communication allocated stream rate table 1700, and specifies the group address of the node N set as the realtime communication destination. In this case, the group address 172.xxx.1.2 of the node N2 is specified.

Next, the extracting unit 1508 references the destination/forwarding address association table 1600, and specifies a forwarding address from the specified group address. The forwarding address (i.e., path) specified at this point is a forwarding address (i.e., path) that will collide with the realtime communication between the nodes N. In other words, the forwarding address specified at this point is a forwarding address to which non-realtime data transmission should be restricted, in order to avoid collisions with the realtime communication among the nodes N. Thus, the transmittable destination list 1800 illustrated in FIG. 18 may be used to manage non-realtime data transmission availability for each forwarding address, for example.

Figure 18:
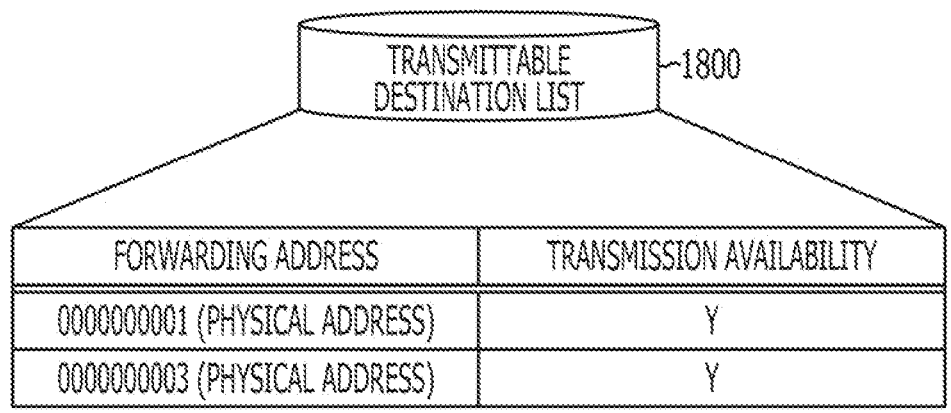
FIG. 18 illustrates a second example of the stored contents of a transmittable destination list.

FIG. 18 illustrates a second example of the stored contents of a transmittable destination list. In FIG. 18, the transmittable destination list 1800 includes the transmission availability for each forwarding address. The transmission availability is information indicating whether or not non-realtime data is transmittable to a particular forwarding address.

As a more specific example, the deciding unit 1507 may change the transmission availability from "Y" to "N" for the forwarding address that would collide with the realtime communication among the nodes N. In this case, since the node N2 is the current node N, the forwarding address is unspecified. Consequently, the transmission availability in the transmittable destination list 1800 is unchanged.

Subsequently, the second computing unit 1509 computes the amount of data that can be transmitted using the path connecting to the junction node JN, on the basis of the data size of the data sequence that has been designated as outgoing data since the cycle start time of the cycle C1 (or the cycle C2) up to the current time (i.e., the sent data size). As a more specific example, the second computing unit 1509 may compute the amount of data that can be transmitted (hereinafter referred to as the remaining allocated stream rate) by subtracting the sent data size from the allocated stream rate that was allocated to the path connecting to the junction node JN.

Then, from among the data group, the extracting unit 1508 extracts data such that the corresponding forwarding addresses have a transmission availability of "Y", and such that the amount of data is less than or equal to the remaining allocated stream rate computed above. As a more specific example, the extracting unit 1508 may reference the transmittable destination list 1800, and specify the forwarding addresses with a transmission availability of "Y". In this case, the forwarding addresses 0000000001 (physical address) and 0000000003 (physical address) are specified.

Next, the extracting unit 1508 extracts the non-realtime data residing in the data queues for the specified forwarding addresses. The deciding unit 1507 designates the extracted non-realtime data as outgoing data. At this point, the non-realtime data designated as outgoing data from among the extracted non-realtime data by the deciding unit 1507 is non-realtime data whose data size is less than or equal to the remaining allocated stream rate computed earlier.

If there exists a plurality of non-realtime data having a data size less than or equal to the remaining allocated stream rate, then the deciding unit 1507 may designate as outgoing data the non-realtime data with the largest data size from among the plurality of data.

On the other hand, if no outgoing non-realtime data exists, then the deciding unit 1507 designates invalid data as outgoing data. This invalid data will be discarded at the switch SW1 directly connected to the current node N. At this point, the deciding unit 1507 may also be configured such that the amount of invalid data designated as outgoing data is equal to the remaining allocated stream rate.

If the determining unit 1506 determines that the elapsed time T2 is not equal to 0 or a constant multiple of the cycle C3, then the second computing unit 1509 computes the remaining time between the time equal to the current time plus the required time t, and the cycle start time of realtime communication. As a more specific example, the second computing unit 1509 may first compute the elapsed time T3 between the cycle start time of the cycle C2 (or the cycle C1) and the next cycle start time of realtime communication that will occur after the current time.

The second computing unit 1509 may then compute the remaining time until the start time of realtime communication by subtracting the elapsed time T2 from the elapsed time T3 thus computed. Herein, the elapsed time T2 is an elapsed time equal to the elapsed time T1 plus the required time t, wherein the elapsed time T1 is the time from the cycle start time of the cycle C2 (or the cycle C1) until the current time.

In addition, the second computing unit 1509 computes the amount of data that can be transmitted in the remaining time on the basis of the transmission capabilities of the network 310. As a more specific example, the second computing unit 1509 may compute the amount of data that can be transmitted in the remaining time by using the earlier Eq. 2.

Subsequently, the extracting unit 1508 extracts data from the data group, wherein the extracted data has a data size less than or equal to the amount of data that can be transmitted in the remaining time. As a more specific example, the extracting unit 1508 may extract arbitrary non-realtime data from the data queues, wherein the amount of extracted data is less than or equal to the amount of data that can be transmitted in the remaining time.

The deciding unit 1507 designates the extracted non-realtime data as outgoing data. At this point, if there exists a plurality of extracted non-realtime data, then the deciding unit 1507 may designate as outgoing data the non-realtime data with the largest data size from among the plurality of data.

However, there is a possibility of data loss if the amount of non-realtime data to be transmitted exceeds the allocated stream rate that can be transmitted per unit time. For this reason, the deciding unit 1507 does not designate non-realtime data exceeding the allocated stream rate as outgoing data, even if the amount of the non-realtime data is less than or equal to the amount of data that can be transmitted in the remaining time. In addition, the decision results thus decided are stored in the RAM 403 or other storage area as the sent data size.

Meanwhile, if no outgoing non-realtime data exists, then the deciding unit 1507 designates invalid data as outgoing data. This invalid data will be discarded at the switch SW1 directly connected to the current node N. At this point, the deciding unit 1507 may also be configured such that the amount of invalid data designated as outgoing data is equal to the amount of data that can be transmitted in the remaining time.

Herein, the realtime data and non-realtime data that has been designated as outgoing data is stored in a buffer. Once the transmission task is launched, the realtime data and non-realtime data stored in the buffer is sent out over the network 310 in its stored order. In this way, by restricting the transmission of non-realtime data that would collide with realtime communication, collisions between realtime communication and non-realtime communication may be avoided.

(Junction Node JN Communication Processing Sequence)

Figure 19:
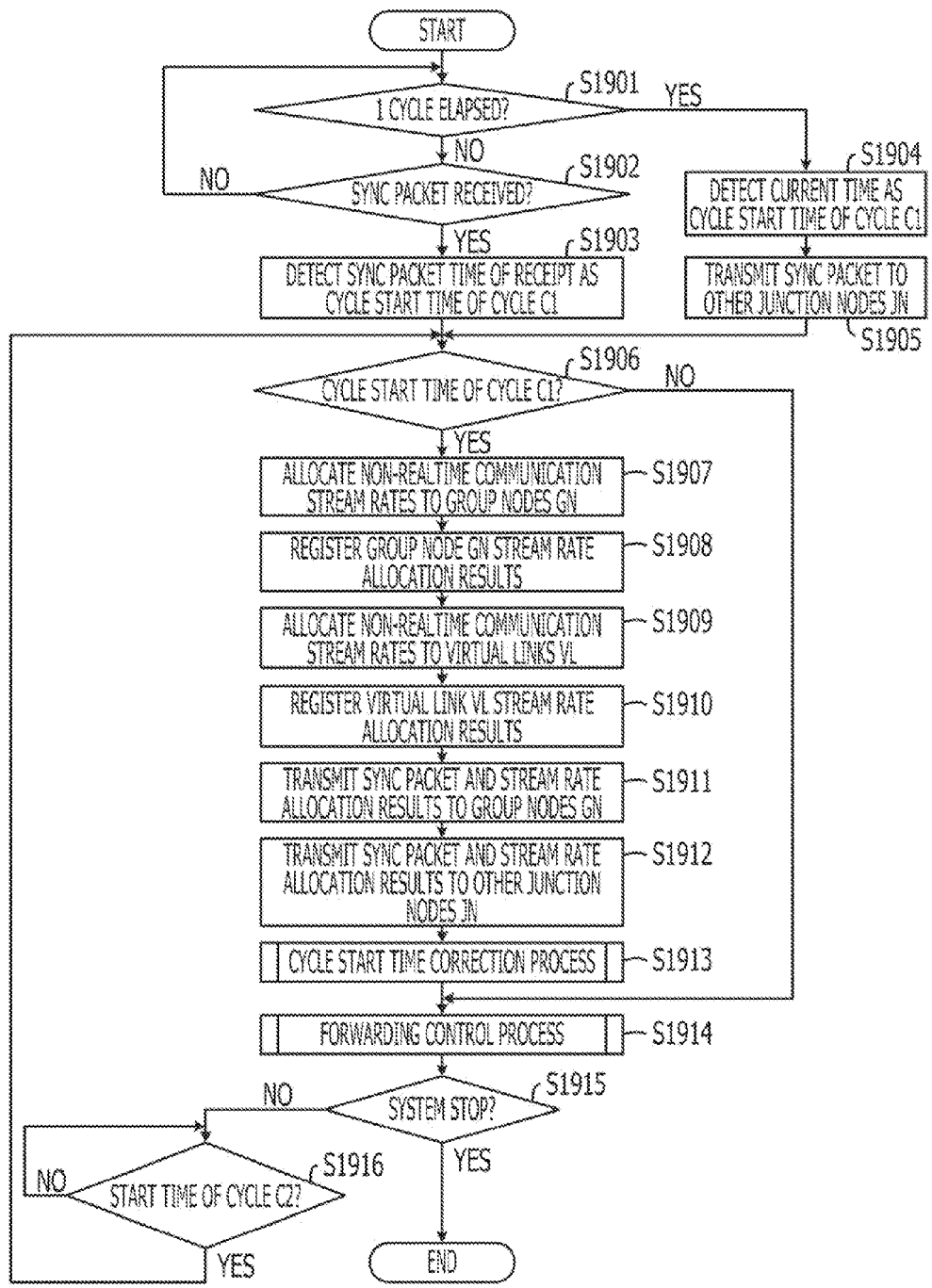
FIG. 19 is a flowchart illustrating one example of a junction node communication processing sequence.

A junction node JN communication processing sequence will now be described. The following assumes that the virtual links VL among the junction nodes JN have been set in advance. FIG. 19 is a flowchart illustrating one example of a junction node communication processing sequence. In the flowchart in FIG. 19, it is first determined whether or not one cycle of the cycle C1 has elapsed since the current node N was activated by the detecting unit 705 (operation S1901).

If one cycle has not elapsed (operation S1901: No), then it is determined whether or not a synchronization packet has been received from another junction node JN by the receiving unit 701 (operation S1902). If a synchronization packet has not been received, then the process returns to operation S1901.

In contrast, if a synchronization packet has been received (operation S1902: Yes), then the time at which the synchronization packet was received is detected as the cycle start time of the cycle C1 by the detecting unit 705 (operation S1903). Meanwhile, if it is determined in operation S1901 that one cycle has elapsed (operation S1901: Yes), then the current time is detected as the cycle start time of the cycle C1 (operation S1904).

Subsequently, a synchronization packet is transmitted to another junction node JN by the transmitting unit 704 (operation S1905). Next, the detecting unit 705 determines whether or not the current time is the cycle start time of the cycle C1 (operation S1906). Specific processing operations for determining whether or not the current time is the cycle start time of the cycle C1 will be described later.

At this point, if the current time is not the cycle start time of the cycle C1 (operation S1906: No), then the process transitions to operation S1914. In contrast, if the current time is the cycle start time of the cycle C1 (operation S1906: Yes), then the allocating unit 706 allocates non-realtime communication stream rates to the group nodes GN within the current group G, on the basis of the transmission capabilities of the network 310 (operation S1907). The allocating unit 706 then registers the group node GN stream rate allocation results in the allocated stream rate/sent data size association table 1100 (operation S1908).

In addition, the allocating unit 706 allocates non-realtime communication stream rates to the virtual links VL established with the other junction nodes JN, on the basis of the transmission capabilities of the network 310 (operation S1909). The allocating unit 706 then registers the virtual link VL stream rate allocation results in the allocated stream rate/sent data size association table 1100 (operation S1910).

Subsequently, the transmitting unit 704 transmits a synchronization packet and the group node GN stream rate allocation results to the group nodes GN (operation S1911). The transmitting unit 704 also transmits a synchronization packet and the virtual link VL stream rate allocation results to the other junction nodes JN (operation S1912).

Next, the detecting unit 705 executes a cycle start time correction process that corrects the cycle start time of the cycle C1 (operation S1913). The transmitting unit 704 then executes a forwarding control process for forwarding non-realtime data to the other junction nodes JN via the virtual links VL (operation S1914).

The detecting unit 705 subsequently determines whether or not stop instructions for the network system 300 exist (operation S1915). The stop instructions for the network system 300 may be received from an external computer apparatus via the network 310, for example.

If stop instructions do not exist (operation S1915: No), then the process waits until the current time reaches the cycle start time of the cycle C2 (operation S1916: No), and returns to operation S1906 when the current time reaches the cycle start time of the cycle C2 (operation S1916: Yes). In contrast, if stop instructions do exist (operation S1915: Yes), then the series of operations executed according to this flowchart is terminated.

An example of specific processing operations executed in operation S1906 to determine whether or not the current time is the cycle start time of the cycle C1 will now be described. Herein, the ratio between the cycle C1 time interval and the cycle C2 time interval is taken to be C1:C2=N:1. Also, the number of loops in the cycle C1 is taken to be n (wherein n has an initial value of 0). In this case, the detecting unit 705 determines that the current time is the cycle start time of the cycle C1 when (n+1)/N yields a remainder of 0.

<Cycle Start Time Correction Process>

Figure 20:
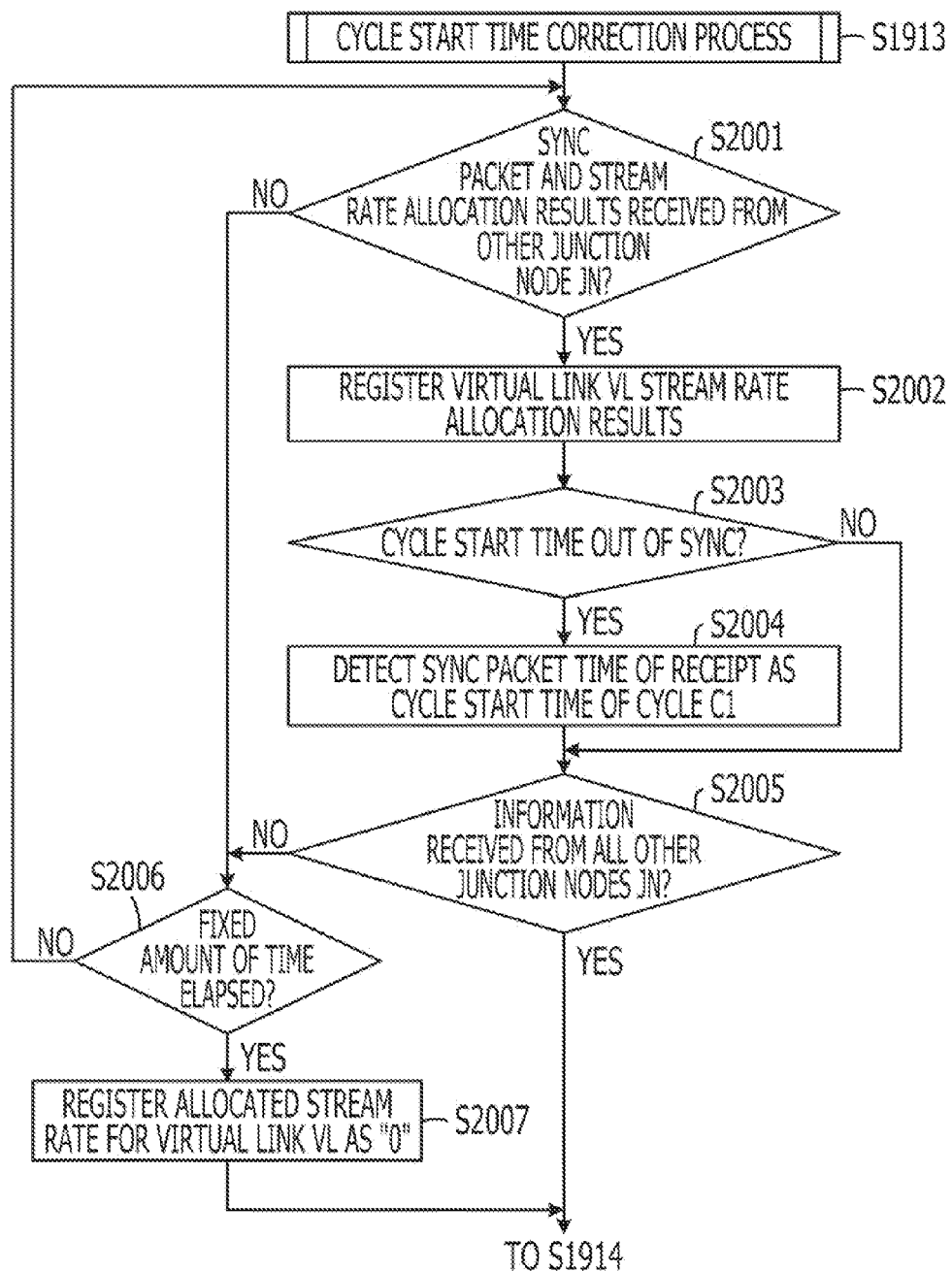
FIG. 20 is a flowchart illustrating one example of a specific processing sequence for the cycle start time correction process of operation S1913.

Next, a specific processing sequence for the cycle start time correction process in operation S1913 illustrated in FIG. 19 will be described. FIG. 20 is a flowchart illustrating one example of a specific processing sequence for the cycle start time correction process executed in operation S1913.

In the flowchart in FIG. 20, it is first determined whether or not a synchronization packet and stream rate allocation results have been received from another junction node JN by the receiving unit 701 (operation S2001). If a synchronization packet and stream rate allocation results have not been received (operation S2001: No), then the process transitions to operation S2006.

In contrast, if a synchronization packet and stream rate allocation results have been received (operation S2001: Yes), then the allocating unit 706 registers the virtual link VL stream rate allocation results in the allocated stream rate/sent data size association table 1100 (operation S2002). The detecting unit 705 also determines whether or not the cycle start time of the cycle C1 is out of sync with the time at which the synchronization packet was received (operation S2003).

If the cycle start time is not out of sync (operation S2003: No), then the process transitions to operation S2005. In contrast, if the cycle start time is out of sync (operation S2003: Yes), then the detecting unit 705 detects the time at which the synchronization packet was received as the cycle start time of the cycle C1 (operation S2004).

Subsequently, it is determined whether or not synchronization packets and stream rate allocation results have been received from all other junction nodes JN by the receiving unit 701 (operation S2005). If the synchronization packets and stream rate allocation results have all been received (operation S2005: Yes), then the process transitions to operation S1914 illustrated in FIG. 19. In contrast, if the synchronization packets and stream rate allocation results have not all been received (operation S2005: No), then the allocating unit 706 determines whether or not a preset, fixed amount of time has elapsed since the first determination operation in operation S2001 (operation S2006).

If the fixed amount of time has not yet elapsed (operation S2006: No), then the process returns to operation S2001. In contrast, if the fixed amount of time has elapsed (operation S2006: Yes), then the allocating unit 706 registers information in the allocated stream rate/sent data size association table 1100, setting the allocated stream rate to 0 for the virtual links VL with other junction nodes JN from which a synchronization packet and stream rate allocation results have not been received (operation S2007). The process then transitions to operation S1914 illustrated in FIG. 19.

In operation S2007 herein, if a value of 0 is consecutively registered as the allocated stream rate for a virtual link VL a prescribed number of times, then it may be determined that the other junction node JN joined by that virtual link VL has been removed from the network system 300.

<Forwarding Control Processing Sequence>

Figure 21:
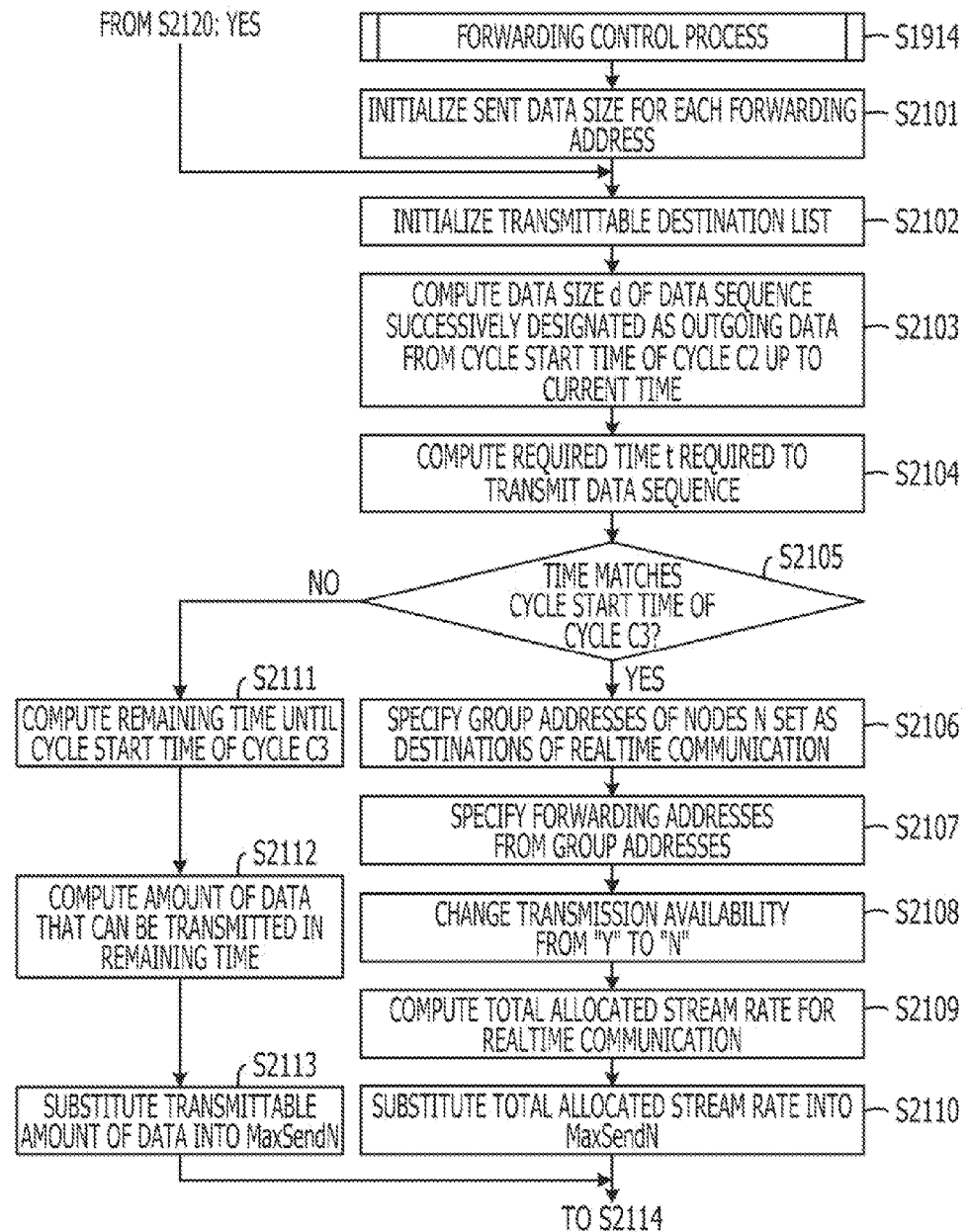
FIG. 21 is the first part of a flowchart illustrating one example of a specific processing sequence for the forwarding control process executed in operation S1914.
Figure 22:
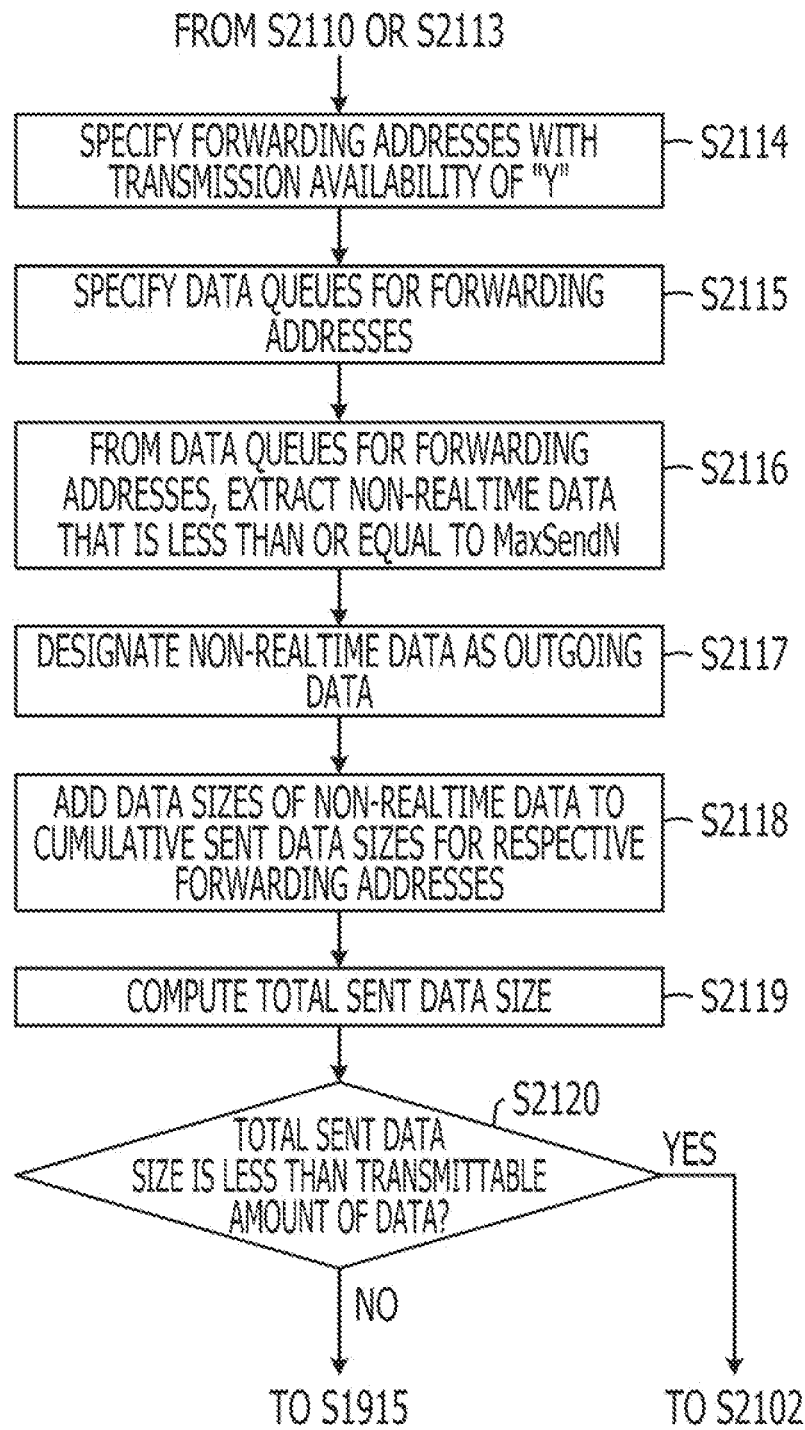
FIG. 22 is the second part of a flowchart illustrating one example of a specific processing sequence for the forwarding control process executed in operation S1914.

Next, a specific processing sequence for the forwarding control process executed in operation S1914 illustrated in FIG. 19 will be described. FIGS. 21 and 22 are a flowchart illustrating one example of a specific processing sequence for the forwarding control process executed in operation S1914.

In the flowchart in FIG. 21, the first computing unit 707 first initializes (i.e., sets to 0) the sent data sizes for the respective forwarding address in the allocated stream rate/sent data size association table 1100 (operation S2101). In addition, the first computing unit 707 initializes the transmittable destination list 1400 (operation S2102).

Subsequently, the first computing unit 707 computes the cumulative sent data size for each forwarding address in the allocated stream rate/sent data size association table 1100, and computes the data size d of the data sequence designated as outgoing data since the cycle start time of the cycle C2 up to the current time (operation S2103). The first computing unit 707 also uses the earlier Eq. 1 to compute the required time t required to transmit the data sequence (operation S2104).

Next, the determining unit 708 determines whether or not the time equal to the current time plus the required time t matches the cycle start time of the realtime communication cycle C3 (operation S2105). If the time does match the cycle start time of the cycle C3 (operation S2105: Yes), then the deciding unit 709 references the realtime communication allocated stream rate table 1300, and specifies the group addresses of the nodes N set as the destinations of the realtime communication (operation S2106).

Subsequently, the deciding unit 709 references the destination/forwarding address association table 900, and specifies forwarding addresses from the specified group addresses (operation S2107). The deciding unit 709 then changes the transmission availability from "Y" to "N" for the specified forwarding addresses in the transmittable destination list 1400 (operation S2108).

Next, the second computing unit 710 references the realtime communication allocated stream rate table 1300, and computes the total allocated stream rate for realtime communication by summing the allocated stream rates that have been allocated to the realtime communication among the nodes N (operation S2109). The deciding unit 709 then substitutes the total allocated stream rate thus computed into MaxSendN (operation S2110), and the process transitions to operation S2114 in FIG. 22. Herein, MaxSendN is a variable.

Meanwhile, if it is determined in operation S2105 that the time does not match the cycle start time of the cycle C3 (operation S2105: No), then the second computing unit 710 computes the remaining time between the time equal to the current time plus the required time t, and the cycle start time of the cycle C3 (operation S2111).

Subsequently, the second computing unit 710 uses the earlier Eq. 2 to compute the amount of data that can be transmitted in the remaining time (operation S2112). The deciding unit 709 then substitutes the amount of data thus computed into MaxSendN (operation S2113), and the process transitions to operation S2114 in FIG. 22. Herein MaxSendN is a variable.

In the flowchart in FIG. 22, the extracting unit 711 first references the transmittable destination list 1400, and specifies the forwarding addresses with a transmission availability of "Y" (operation S2114). Next, the extracting unit 711 references the queue association table 1000, and specifies the data queues for the specified forwarding addresses (operation S2115).

Subsequently, the extracting unit 711 extracts non-realtime data from the data queues for the specified forwarding addresses, wherein the amount of data is less than or equal to MaxSendN (operation S2116). The deciding unit 709 then designates the extracted non-realtime data as outgoing data (operation S2117). However, the deciding unit 709 does not designate as outgoing data the non-realtime data for forwarding addresses that would exceed their allocated stream rate.

Meanwhile, if no outgoing non-realtime data exists in operation S2117, then the deciding unit 709 designates invalid data as outgoing data. This invalid data will be discarded at the switch SW1 directly connected to the current node N. At this point, an amount of invalid data equal to MaxSendN is designated as outgoing data by the deciding unit 709.

Next, the deciding unit 709 adds the data sizes of the non-realtime data designated as outgoing data to the cumulative values of the sent data size for each forwarding address in the allocated stream rate/sent data size association table 1100 (operation S2118). The deciding unit 709 then computes the total sent data size by summing the sent data size for each forwarding address in the allocated stream rate/sent data size association table 1100 (operation S2119).

Subsequently, the deciding unit 709 determines whether or not the total sent data size thus computed is less than the amount of transmittable data that can be transmitted in the cycle C2 (operation S2120). If the total sent data size is less than the amount of transmittable data (operation S2120: Yes), then the process returns to operation S2102 illustrated in FIG. 21. In contrast, if the total sent data size is equal to or greater than the amount of transmittable data (operation S2120: No), then the process transitions to S1915 illustrated in FIG. 19.

In so doing, collisions between realtime communication and non-realtime communication may be avoided in the network system 300. Moreover, since the configuration herein restricts only the transmission of non-realtime data that would collide with realtime communication, drops in the overall throughput of the network 310 may be suppressed.

(Group Node GN Communication Processing Sequence)

Figure 23:
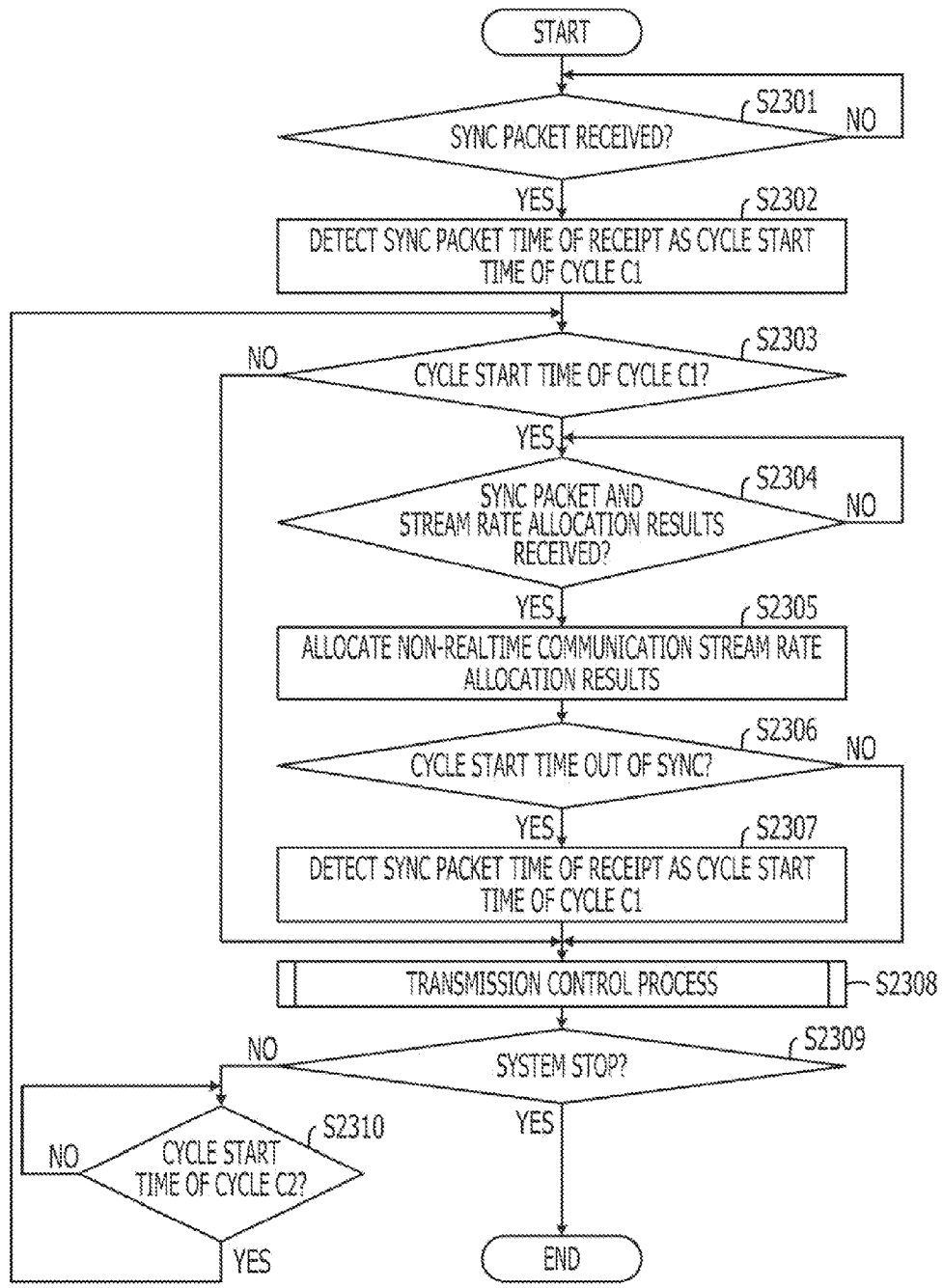
FIG. 23 is a flowchart illustrating one example of a group node communication processing sequence.

Next, a group node GN communication processing sequence will be described. FIG. 23 is a flowchart illustrating one example of a group node communication processing sequence. In the flowchart in FIG. 23, it is first determined whether or not a synchronization packet has been received from a junction node JN by the receiving unit 1501 (operation S2301).

At this point, the process waits to receive a synchronization packet (operation S2301: No), and once received (operation S2301: Yes), the detecting unit 1502 detects the time at which the synchronization packet was received as the cycle start time of the cycle C1 (operation S2302). Subsequently, the detecting unit 1502 determines whether or not the current time is the cycle start time of the cycle C1 (operation S2303).

If the current time is not the cycle start time of the cycle C1 (operation S2303: No), then the process transitions to operation S2308). In contrast, if the current time is the cycle start time of the cycle C1 (operation S2303: Yes), then it is determined whether or not a synchronization packet and stream rate allocation results have been received from a junction node JN by the receiving unit 1501 (operation S2304).

At this point, the process waits to receive a synchronization packet and stream rate allocation results (operation S2304: No), and once received (operation S2304: Yes), the allocating unit 1504 takes the received non-realtime communication stream rate allocation results, and allocates the stream rate to the path joining the current node N with its junction node JN (operation S2305).

Next, the detecting unit 1502 determines whether or not the cycle start time of the cycle C1 is out of sync with the time at which the synchronization packet was received (operation S2306). If the cycle start time is not out of sync (operation S2306: No), then the process transitions to operation S2308. In contrast, if the cycle start time is out of sync (operation S2306: Yes), then the detecting unit 1502 detects the time at which the synchronization packet was received as the cycle start time of the cycle C1 (operation S2307).

The transmitting unit 1503 then executes a transmission control process for transmitting realtime data and/or non-realtime data (operation S2308). Subsequently, the detecting unit 1502 determines whether or not stop instructions for the network system 300 exist (operation S2309).

If stop instructions do not exist (operation S2309: No), then the process waits until the current time reaches the cycle start time of the cycle C2 (operation S2310: No), and returns to operation S2303 when the current time reaches the cycle start time of the cycle C2 (operation S2310: Yes). In contrast, if stop instructions do exist (operation S2309: Yes), then the series of operations executed according to this flowchart is terminated.

<Transmission Control Processing Sequence>

Figure 24:
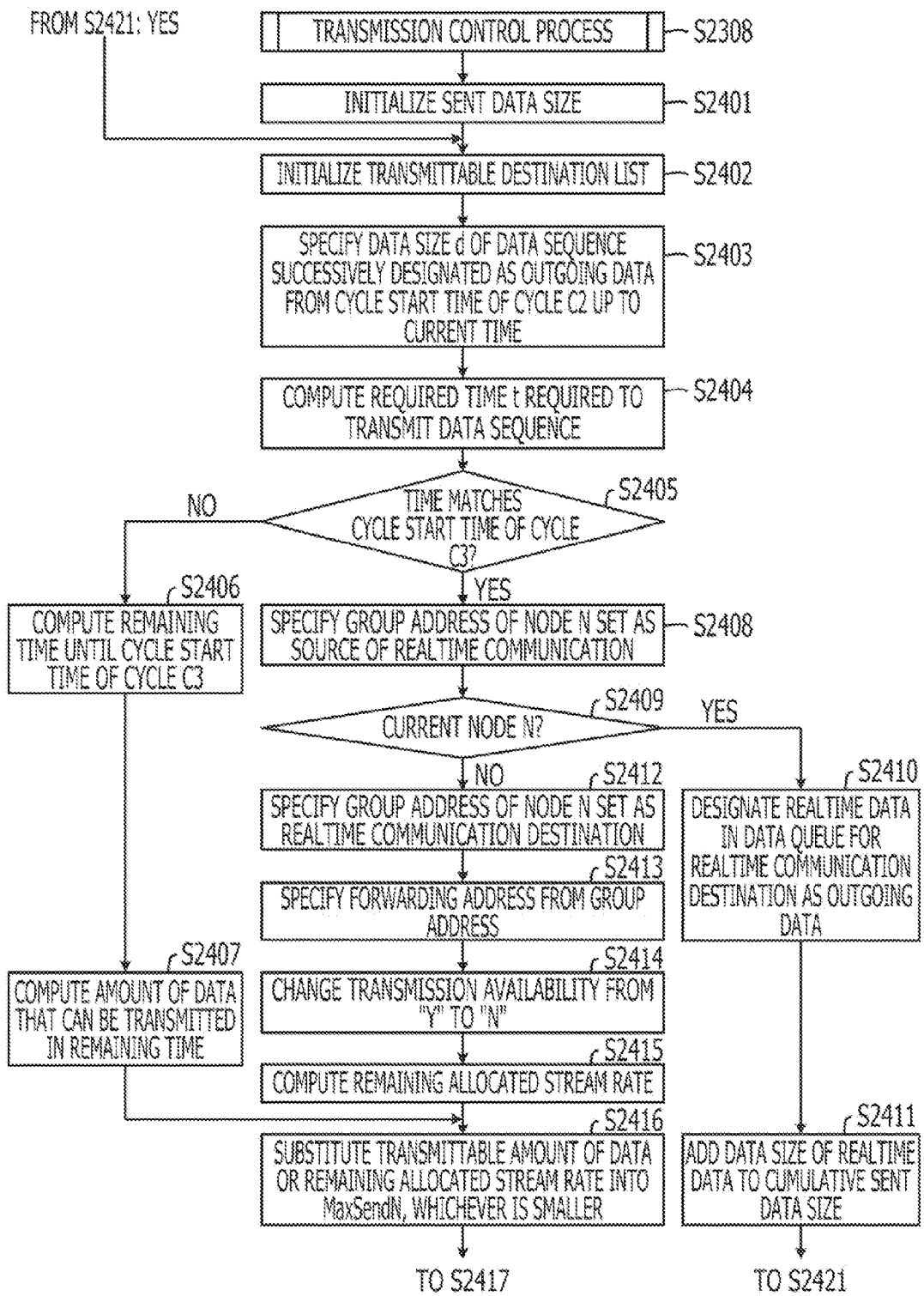
FIG. 24 is the first part of a flowchart illustrating one example of a specific processing sequence for the transmission control process executed in operation S2308.
Figure 25:
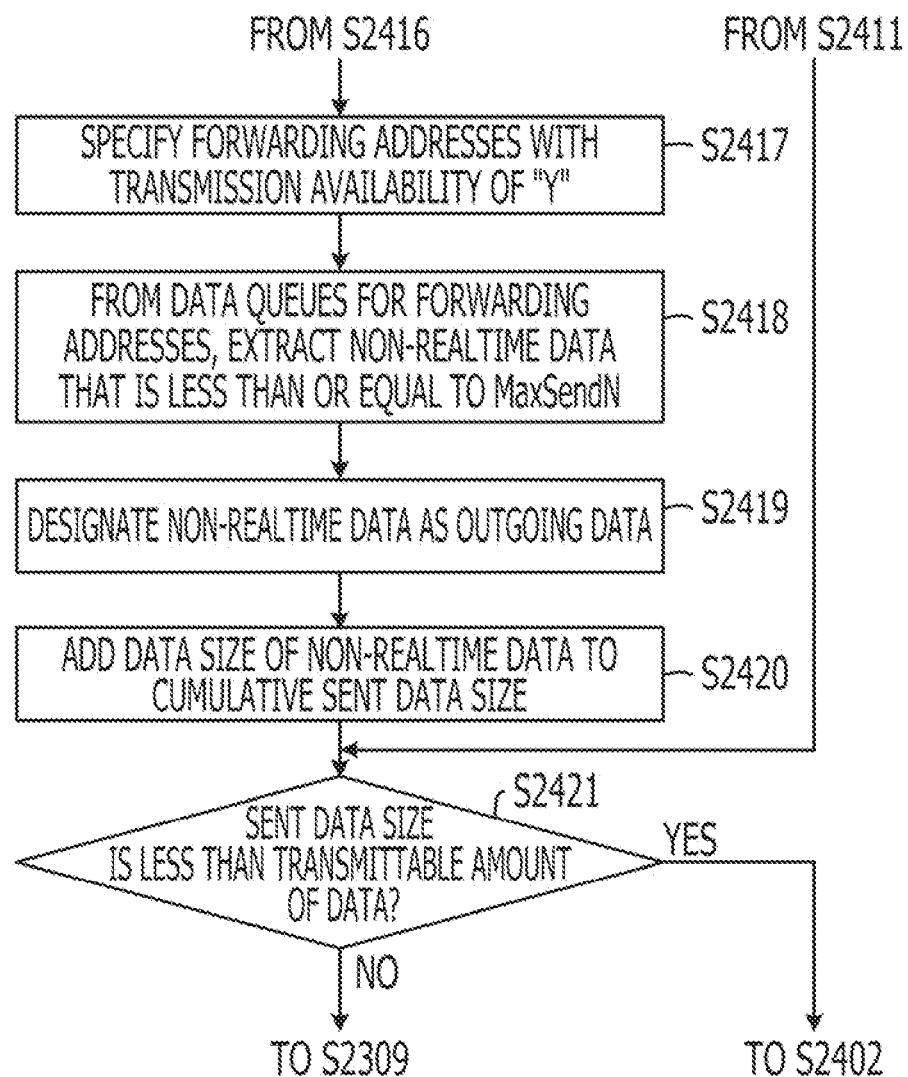
FIG. 25 is the second part of a flowchart illustrating one example of a specific processing sequence for the transmission control process executed in operation S2308.

Next, an example of a specific processing sequence for the transmission control process executed in operation S2308 illustrated in FIG. 23 will be described. FIGS. 24 and 25 are a flowchart illustrating one example of a specific processing sequence for the transmission control process executed in operation S2308.

In the flowchart in FIG. 24, the first computing unit 1505 first initializes (i.e., sets to 0) the sent data size for the path joining the current node N to its junction node JN (operation S2401). In addition, the first computing unit 1505 initializes the transmittable destination list 1800 (operation S2402).

Subsequently, from the sent data size, the first computing unit 1505 specifies the data size d of the data sequence designated as outgoing data since the cycle start time of the cycle C2 up to the current time (operation S2403). The first computing unit 1505 then uses the earlier Eq. 1 to compute the required time t required to transmit the data sequence (operation S2404).

Next, the determining unit 1506 determines whether or not the time equal to the current time plus the required time t matches the cycle start time of the realtime communication cycle C3 (operation S2405). If the time does not match the cycle start time of the cycle C3 (operation S2405: No), then the second computing unit 1509 computes the remaining time between the time equal to the current time plus the required time t, and the cycle start time of the cycle C3 (operation S2406).

Subsequently, the second computing unit 1509 uses the earlier Eq. 2 to compute the amount of data that can be transmitted in the remaining time (operation S2407), and the process transitions to operation S2416. In contrast, if it is determined in operation S2405 that the time does match the cycle start time of the cycle C3 (operation S2405: Yes), then the deciding unit 1507 references the realtime communication allocated stream rate table 1700, and specifies the group address of the node N set as the source of the realtime communication (operation S2408).

The deciding unit 1507 then compares the specified group address to the group address of the current node N, and determines whether or not the source of the realtime communication is the current node N (operation S2409). If the source is the current node N (operation S2409: Yes), then the deciding unit 1507 designates the leading realtime data in the data queue for the realtime communication destination as outgoing data (operation S2410).

The deciding unit 1507 then adds the data size of the realtime data designated as outgoing data to the cumulative value of the sent data size (operation S2411), and the process transitions to operation S2421 illustrated in FIG. 25.

In contrast, if the source is not the current node N (operation S2409: No), then the deciding unit 1507 specifies the group address of the node N set as the destination of the realtime communication (operation S2412). Subsequently, the deciding unit 1507 references the destination/forwarding address association table 1600, and specifies the forwarding address from the specified group address (operation S2413).

The deciding unit 1507 then changes the transmission availability for the specified forwarding address from "Y" to "N" in the transmittable destination list 1800 (operation S2414). Next, the second computing unit 1509 computes the remaining allocated stream rate by subtracting the sent data size from the allocated stream rate that was allocated to the path joining the current node N to its junction node JN (operation S2415).

The deciding unit 1507 then substitutes the remaining allocated stream rate or the amount of transmittable data (whichever is smaller) into MaxSendN (operation S2416), and the process transitions to operation S2417 in FIG. 25.

In the flowchart in FIG. 25, the extracting unit 1508 first references the transmittable destination list 1800, and specifies the forwarding addresses with a transmission availability of "Y" (operation S2417). Next, the extracting unit 1508 extracts non-realtime data from the data queues for the specified forwarding addresses, wherein the amount of extracted data is less than or equal to MaxSendN (operation S2418).

The deciding unit 1507 then designates the extracted non-realtime data as outgoing data (operation S2419). Next, the deciding unit 1507 adds the data size of the non-realtime data designated as outgoing data to the cumulative sent data size (operation S2420).

Meanwhile, if no outgoing non-realtime data exists in operation S2419, then the deciding unit 1507 designates invalid data as outgoing data. This invalid data will be discarded at the switch SW directly connected to the current node N. At this point, an amount of invalid data equal to MaxSendN is designated as outgoing data by the deciding unit 1507.

Subsequently, the deciding unit 1507 determines whether or not the sent data size is less than the allocated stream rate (operation S2421). If the sent data size is less than the allocated stream rate (operation S2421: Yes), then the process returns to operation S2402 illustrated in FIG. 24. In contrast, if the sent data size is equal to or greater than the allocated stream rate (operation S2421: No), then the process transitions to operation S2309 illustrated in FIG. 23.

In so doing, collisions between realtime communication and non-realtime communication can be avoided in the network system 300. Moreover, since the configuration herein restricts only the transmission of non-realtime data that would collide with realtime communication, drops in the overall throughput of the network 310 can be suppressed.

<Realtime Communication Stream Rate Allocation Request Processing Sequence>

Figure 26:
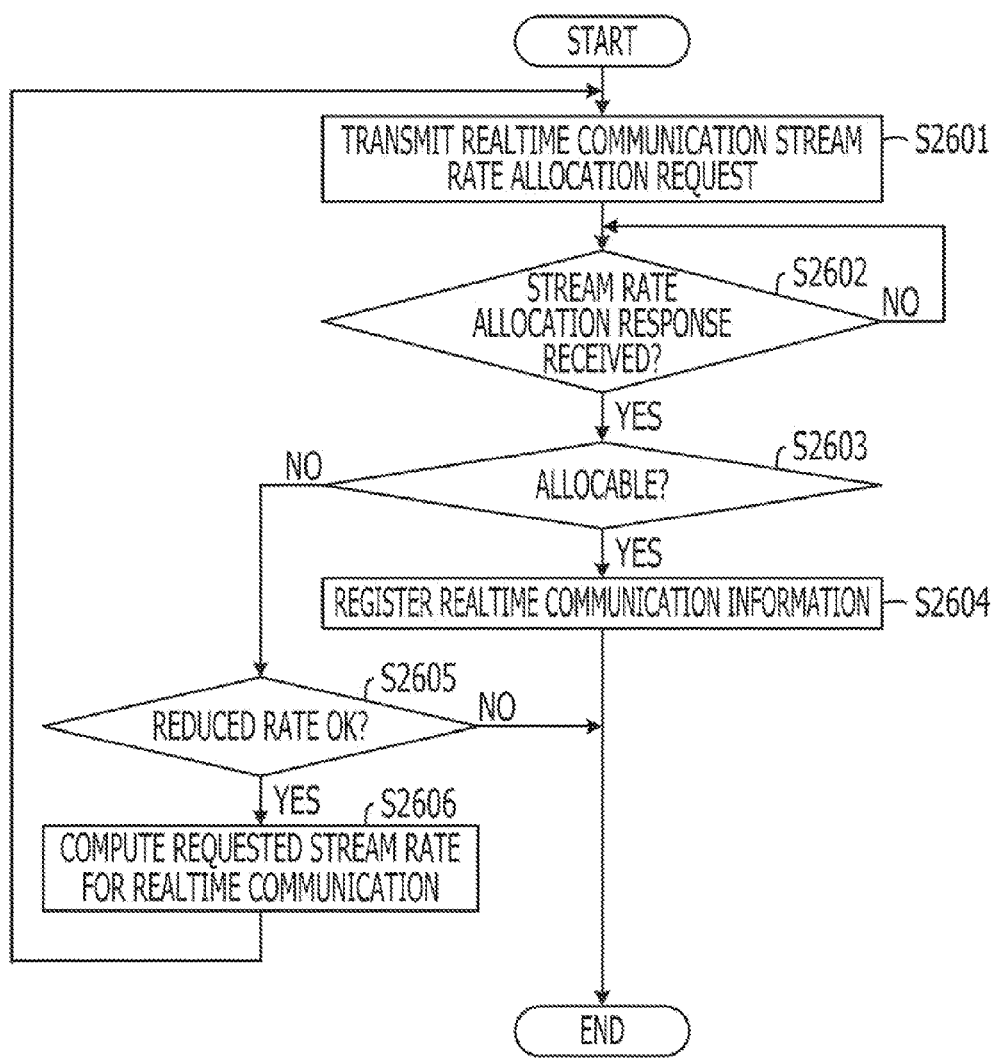
FIG. 26 is a flowchart illustrating one example of a realtime communication stream rate allocation request processing sequence.

Next, a realtime communication stream rate allocation request processing sequence executed by a group node GN will be described. FIG. 26 is a flowchart illustrating one example of a realtime communication stream rate allocation request processing sequence. In the flowchart in FIG. 26, the transmitting unit 1503 first transmits a realtime communication stream rate allocation request to a junction node JN (operation S2601).

Subsequently, the process waits for a stream rate allocation response to be received from the junction node JN by the receiving unit 1501 (operation S2602: No), and once received (operation S2602: Yes), the group node GN determines whether or not the requested stream rate is allocable (operation S2603).

If the requested stream rate is allocable (operation S2603: Yes), then the group node GN registers the realtime communication information as a new record in the realtime communication allocated stream rate table 1700 (operation S2604). The series of operations executed according to this flowchart is then terminated.

In contrast, if the requested stream rate is not allocable (operation S2603: No), then the group node GN determines whether or not the requested stream rate for realtime communication can be reduced (operation S2605). If the requested stream rate cannot be reduced (operation S2605: No), then the series of operations executed according to this flowchart is terminated.

In contrast, if the requested stream rate can be reduced (operation S2605: Yes), then the group node GN computes a new requested stream rate for realtime communication (operation S2606), and the process returns to operation S2601.

<Realtime Communication Stream Rate Allocation Response Processing Sequence>

Figure 27:
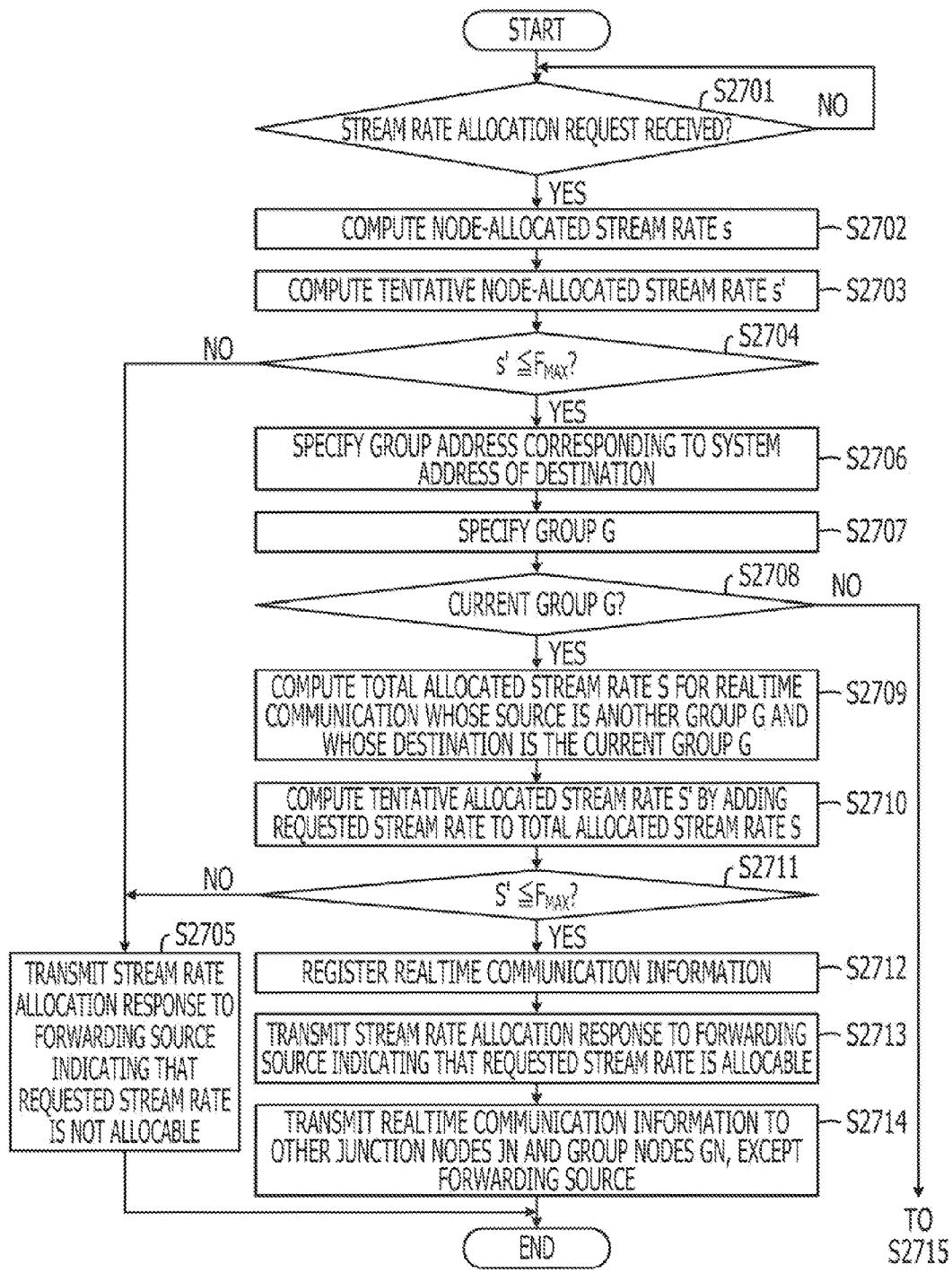
FIG. 27 is the first part of a flowchart illustrating one example of a realtime communication stream rate allocation response processing sequence.
Figure 28:
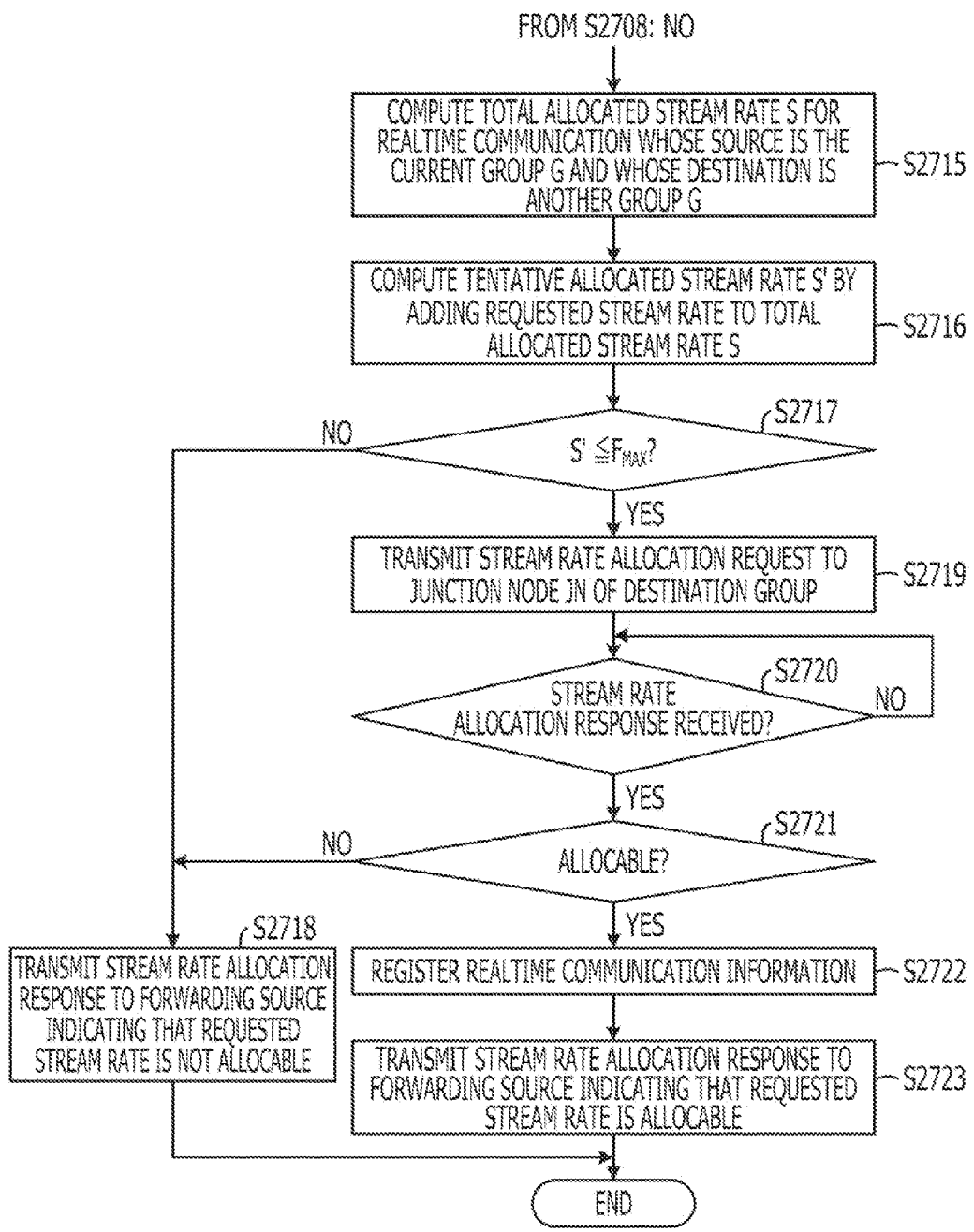
FIG. 28 is the second part of a flowchart illustrating one example of a realtime communication stream rate allocation response processing sequence.

Next, a realtime communication stream rate allocation response processing sequence executed by a junction node JN will be described. FIGS. 27 and 28 are a flowchart illustrating one example of a realtime communication stream rate allocation response processing sequence. In the flowchart in FIG. 27, it is first determined whether or not a realtime communication stream rate allocation request has been received from the forwarding source by the receiving unit 701 (operation S2701).

At this point, the process waits to receive a realtime communication stream rate allocation request (operation S2701: No), and once received (operation S2701: Yes), the judging unit 712 references the realtime communication allocated stream rate table 1300, and computes the total node-allocated stream rate s (operation S2702).

Next, the judging unit 712 computes a tentative node-allocated stream rate s' by adding the requested stream rate contained in the stream rate allocation request to the total node-allocated stream rate s computed above (operation S2703). The judging unit 712 then determines whether or not the tentative node-allocated stream rate s' is less than or equal to the maximum data size $F_{MAX}$ that can be transmitted during the realtime communication cycle C3 (operation S2704).

If the tentative node-allocated stream rate s' is greater than the maximum data size $F_{MAX}$ (operation S2704: No), then the transmitting unit 704 transmits a stream rate allocation response to the forwarding source, which indicates that the requested stream rate is not allocable (operation S2705). The series of operations executed according to this flowchart is then terminated.

In contrast, if the tentative node-allocated stream rate s' is less than or equal to the maximum data size $F_{MAX}$ (operation S2704: Yes), then the judging unit 712 references the address table 500, and specifies the group address that corresponds to the system address of the destination contained in the stream rate allocation request (operation S2706).

The judging unit 712 then references the group identification table 600, and specifies the group G that corresponds to the specified group address (operation S2707). Subsequently, the judging unit 712 determines whether or not the specified group G is the current group G (operation S2708).

If the specified group G is the current group G (operation S2708: Yes), then the judging unit 712 references the realtime communication allocated stream rate table 1300, and computes the total allocated stream rate S for realtime communication whose source is another group G and whose destination is the current group G (operation S2709).

Subsequently, the judging unit 712 computes a tentative allocated stream rate S' by adding the requested stream rate to the total allocated stream rate S computed above (operation S2710). The judging unit 712 then determines whether or not the tentative allocated stream rate S' is less than or equal to the maximum data size $F_{MAX}$ that can be transmitted in the realtime communication cycle C3 (operation S2711).

If the tentative allocated stream rate S' is greater than the maximum data size $F_{MAX}$ (operation S2711: No), then the process transitions to operation S2705. In contrast, if the tentative allocated stream rate S' is less than or equal to the maximum data size $F_{MAX}$ (operation S2711: Yes), then the judging unit 712 registers new realtime communication information in the realtime communication allocated stream rate table 1300 (operation S2712).

The transmitting unit 704 then transmits a stream rate allocation response to the forwarding source, which indicates that the requested stream rate is allocable (operation S2713). In addition, the transmitting unit 704 transmits the realtime communication information to all other junction node JN except the forwarding source, and to the group nodes GN in the current group G (operation S2714). In so doing, the newly registered realtime communication information is shared.

Meanwhile, if it is determined in operation S2708 that the specified group is another group G (operation S2708: No), then the process transitions to operation S2715 in FIG. 28.

In the flowchart illustrated in FIG. 28, the judging unit 712 first references the realtime communication allocated stream rate table 1300, and computes the total allocated stream rate S for realtime communication whose source is the current group G and whose destination is another group G (operation S2715).

Subsequently, the judging unit 712 computes a tentative allocated stream rate S' by adding the requested stream rate to the total allocated stream rate S computed above (operation S2716). The judging unit 712 then determines whether or not the tentative allocated stream rate S' is less than or equal to the maximum data size $F_{MAX}$ that can be transmitted in the realtime communication cycle C3 (operation S2717).

If the tentative allocated stream rate S' is greater than the maximum data size $F_{MAX}$ (operation S2717: No), then the transmitting unit 704 transmits a stream rate allocation response to the forwarding source, which indicates that the requested stream rate is not allocable (operation S2718). The series of operation executed according to this flowchart is then terminated.

In contrast, is the tentative allocated stream rate S' is less than or equal to the maximum data size $F_{MAX}$ (operation S2717: Yes), then the transmitting unit 704 transmits a stream rate allocation request to the junction node JN of the specified group G (operation S2719). Subsequently, the process waits for a stream rate allocation response to be received from the other junction node JN by the receiving unit 701 (operation S2720: No).

Once a stream rate allocation response is received (operation S2720: Yes), the judging unit 712 determines whether or not the stream rate allocation response indicates that the requested stream rate is allocable (operation S2721). If the requested stream rate is not allocable (operation S2721: No), then the process transitions to operation S2718.

In contrast, if the requested stream rate is allocable (operation S2721: Yes), then the judging unit 712 registers new realtime communication information in the realtime communication allocated stream rate table 1300 (operation S2722). Lastly, the transmitting unit 704 transmits a stream rate allocation response to the forwarding source, which indicates that the requested stream rate is allocable (operation S2723). The series of operations executed according to this flowchart is then terminated.

In so doing, it becomes possible to avoid situations where a stream rate that exceeds the transmission capabilities of the network 310 is allocated in response to a stream rate allocation request for realtime communication. As a result, the discarding of data en route by the switches SW1 to SW4 or other apparatus may be prevented, and quality of service may be ensured for realtime communication.

As described in the foregoing, according to the present embodiment, virtual links VL joining junction nodes JN selected from each group G can be used to forward non-realtime data among the groups G. In so doing, the non-realtime data forwarded among the groups G can be bundled together, and collisions with realtime communication may be decreased.

Furthermore, according to the present embodiment, the time to transmit the next data to be stored can be predicted from the required time t required to transmit the data sequence currently being stored in a buffer over the network 310. A determination can then be made to determine whether or not the predicted time matches the start time for realtime communication.

As a result, when the predicted time matches the start time for realtime communication, non-realtime data on paths that will not collide with the realtime communication can be designated as outgoing data. In contrast, when the predicted time does not match the start time for realtime communication, other non-realtime data can be designated as outgoing data, wherein the amount of data is less than or equal to the amount of data that can be transmitted until the start time for realtime communication.

In so doing, only the non-realtime data that would collide with the realtime communication is restricted, and drops in the overall throughput of the network 310 may be suppressed. Moreover, by storing a data sequence in the buffer that has been rearranged so as to not collide with the realtime communication, control of the transmission timings becomes unnecessary.

For example, consider the case of forwarding a video shot by a camera using realtime communication on an extremely short cycle C3 (125 µs, for example) by a timer process (i.e., an interrupt process). In this case, it is anticipated that the CPU 401 will use up all its resources just for this transmission process, and will become unable to execute other processes. However, according to the present embodiment, it becomes unnecessary to control the transmission timings so as to match the extremely short cycle C3, and thus collisions with the realtime communication can be avoided, even if not every node N is equipped with a high-performance CPU 401.

In addition, according to the present embodiment, even if there exists no suitable non-realtime data to be designated as outgoing data, invalid data can be designated as outgoing data, which will then be discarded at a switch SW. In so doing, the data sequence can be adjusted so as to not collide with the realtime communication.

In addition, according to the present embodiment, the type of protocol used to conduct the realtime communication is not limited. For this reason, the work to setup a protocol typically required for realtime communication (such as the Real-time Transport Protocol (RTP)) becomes unnecessary, and the workload of the workers establishing the system can be decreased.

Also, according to the present embodiment, it becomes possible to establish a network system 300 using a plurality of switches SW, and thus system flexibility and expandability may be improved. Furthermore, according to the present embodiment, quality of service may be ensured, even in cases where the realtime communication between nodes N crosses several switches SW. Additionally, in a local network having multistage switch connections where two types of communication coexist, collisions between the two types of communication may be avoided, thereby enabling extremely short-cycle isochronous transfers to be executed without delays.

From the above, according to the disclosed node, communication program, and communication method, quality of service may be ensured for realtime communication, even in environments where high-load non-realtime communication is being conducted. In such cases, communication may be controlled so as to avoid collisions between realtime communication and non-realtime communication carried on the same physical communication medium joining the nodes N. For this reason, it is unnecessary to prepare a communication medium for each individual communication type, thereby preventing increases in the complexity and cost of the system.

In the foregoing communication technique, a topology constraint exists: switches SW not directly connected to a junction node JN cannot be connected adjacent to each other. For example, when installing core switches, router switches, or other switches SW that join switches SW together, switches SW not directly connected to a junction node JN will be connected adjacent to each other. In such cases, there is a possibility of data colliding between the switches SW not directly connected to a junction node JN.

Thus, junction nodes JN may be installed at the switches SW that join other switches SW together. More specifically, a junction node JN may be installed at a switch SW that joins together a switch SW directly connected to a junction node JN, and a switch SW not directly connected to a junction node JN.

Figure 29:
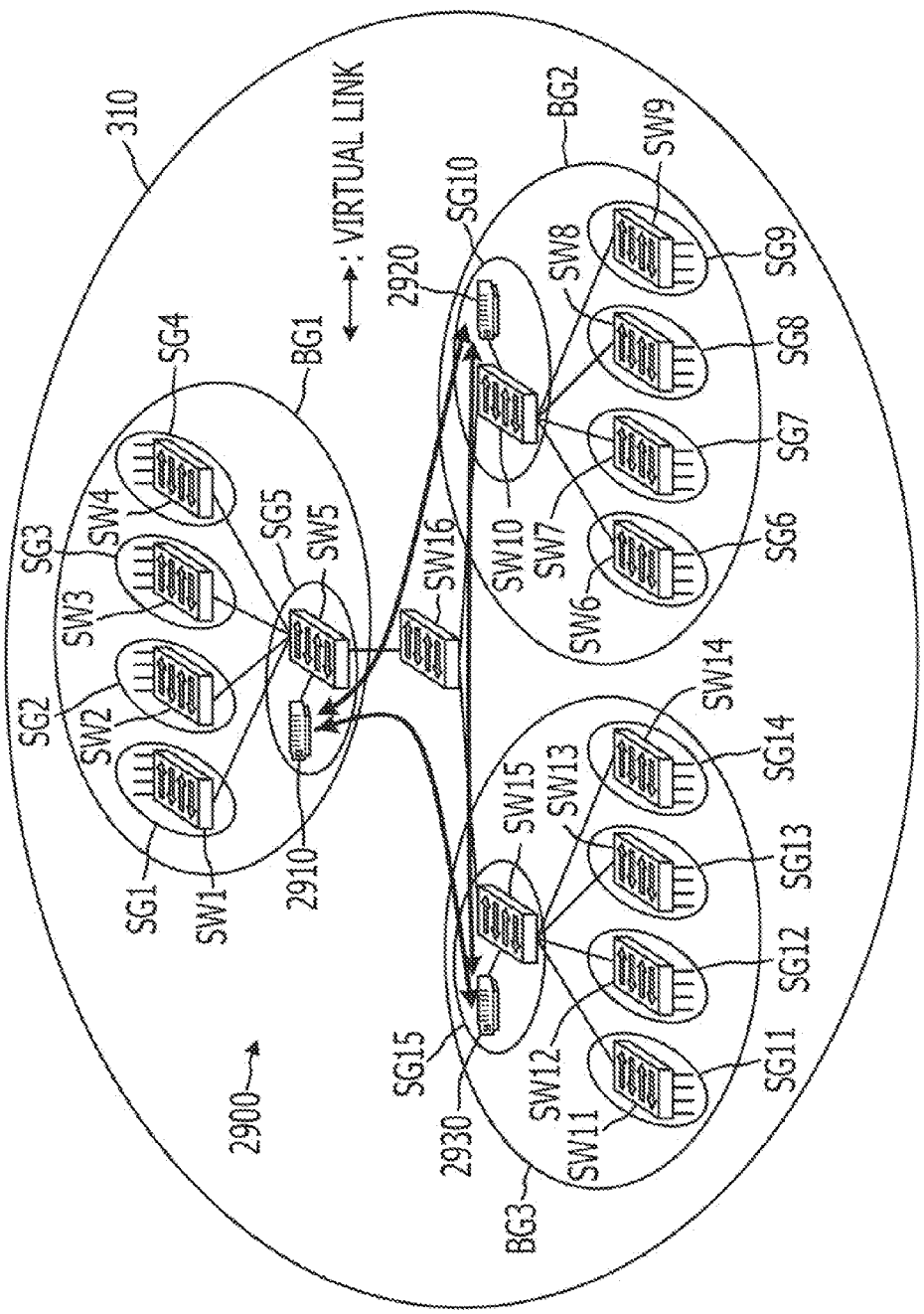
FIG. 29 illustrates a second system configuration of a network system.

FIG. 29 illustrates a second system configuration of a network system. In the network system 2900, small groups SG1 to SG15 are formed by node groups (not illustrated) directly connected to individual switches SW1 to SW16. These small groups SG1 to SG15 are communicably connected via a network 310.

In addition, a big group BG1 is formed by the small groups SG1 to SG5, a big group BG2 is formed by the small groups SG6 to SG10, and a big group BG3 is formed by the small groups SG11 to SG15. Herein, the switches SW5, SW10, and SW15 are core switches that join together other switches. Consequently, the junction nodes JN 2910, 2920, and 2930 are installed at the switches SW5, SW10, and SW15, respectively.

In the network system 2900, non-realtime communication that crosses the big groups BG1 to BG3 involves communication between the small groups, wherein non-realtime data is transmitted once to the junction node JN of a big group (i.e., the junction node 2910, 2920, or 2930, for example). In addition, by performing a communication processing sequence similar to that executed by the junction nodes JN between the small groups, collisions between the realtime communication and the non-realtime communication may be avoided in the communication between the big groups. In this way, by preventing switches without a direct junction node from being adjacently connected, the configuration can accommodate large-scale systems.

It should be appreciated that the communication method described in the present embodiment may be realized by a personal computer, workstation, or other computer executing a program. Such a communication program may be recorded onto a computer-readable non-transitory medium such as a hard disk, flexible disk, CD-ROM, MO, or DVD. The communication program may then be read out from the recording medium and executed by the computer. Alternatively, the communication program may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A first node that executes primary communication and secondary communication via a network between a first node group and a second node group, the first node group including the first node and a second node, the second node group including a third node and a fourth node, the first node comprising:
    a memory; and
    a processor coupled to the memory and configured to:
        set a communication path via the network between the first node and the third node;
        take data from among data received from the second node, and designate the data as outgoing data, the designated data being data related to secondary communication conducted between the second node and the fourth node;
        transmit the data that was designated as outgoing data to the third node via the communication path;
        compute, based on transmission capabilities of the network, a required time to transmit data that has been designated as outgoing data from a start time of a periodically executed transmission process with regard to the primary communication up until a current time; and
        determine whether a time equal to the current time plus the required time matches the start time of the primary communication periodically conducted between the second node and the fourth node,
    the processor decides which data from among the received data to designate as outgoing data based on a relationship between the time equal to the current time plus the required time and the start time,
    the designated data being data related to the secondary communication differs from data being sent by the primary communication.

2. The first node according to claim 1, wherein the processor is further configured to:
    when it is determined that the time equal to the current time plus the required time matches the start time of the primary communication, extract data from among the received data, wherein the extracted data is arbitrary data that is not destined for the third node of the second node group provided with the fourth node set as the destination of the primary communication, and
    designate the extracted data as outgoing data.

3. The first node according to claim 2, wherein the processor is further configured to:
    designate data from among the extracted data as outgoing data, wherein the data size of the designated data is less than or equal to the data size of data related to the primary communication executed between the second node and the fourth node at the time equal to the current time plus the required time.

4. The first node according to claim 2, wherein the processor is further configured to:
    when it is determined that the time equal to the current time plus the required time does not match the start time of the primary communication, compute, based on the transmission capabilities of the network, an amount of data that can be transmitted in the remaining time between the time equal to the current time plus the required time, and the start time of the primary communication, and
    extract, from the received data, an amount of data that is less than or equal to the computed amount of data.

5. The first node according to claim 1, wherein the processor is further configured to:
    in a case where no outgoing data exists from among the received data, designate data that will be discarded at a junction apparatus of the network as the outgoing data.

6. The first node according to claim 1, wherein the processor is further configured to:
    transmit data to the second node, wherein the transmitted data is data that has been successively designated as outgoing data from among the data received from the third node via the communication path.

7. The first node according to claim 1, wherein the communication path via the network between the first node and the third node is a link using a virtual network technology.

8. The first node according to claim 1, wherein the primary communication is a real time communication which data transfer is guaranteed to be completed within a given time interval and the secondary communication is a non-realtime communication other than the real time communication.

9. The first node according to claim 1, wherein
the periodically executed transmission process transmits data at a given time interval, and
the designated data being data related to the secondary communication differs from data being sent by the periodically executed transmission process with respect to the primary communication in between a first time and a second time after elapsing the given time interval from the first time.

10. The first node according to claim 1, wherein
the first node and the second node are connected to a first switch,
the third node and the fourth node are connected to a second switch other than the first switch, and
the secondary communication conducted between the second node and the fourth node includes a first path between the second node and the first node via the first switch, a second path between the first node and the third node via the first switch and the second switch, and a third path between the third node and the fourth node via the second switch.

11. A first node that executes primary communication and secondary communication via a network between a first node group and a second node group, the first node group including the first node and a second node, the second node group including a third node and a fourth node, the first node comprising:
a memory; and
a processor coupled to the memory and configured to execute a process, the process including:
receiving, from the second node, data related to the secondary communication conducted between the second node and the fourth node,
setting a communication path via the network between the first node and the third node,
computing, based on transmission capabilities of the network, a required time to transmit data that has been designated as outgoing data from a start time of a periodically executed transmission process with regard to the primary communication up until a current time, wherein the designated data is data from among the received data that has been successively designated as outgoing data,
determining whether a time equal to the current time plus the required time matches the start time of the primary communication periodically conducted between the second node and the fourth node, and
deciding which data from among the received data to designate as outgoing data based on the determining,
the data related to the secondary communication differs from data being sent by the primary communication.

12. A node on a network in which a plurality of node groups are connected via at least one junction apparatus, the node comprising:
a memory; and
a processor coupled to the memory and configured to:
take data successively designated as outgoing data from among a data group, and transmit the data to a node selected from the node group from among the plurality of node groups that contains a current node,
compute, based on transmission capabilities of the network, a required time to transmit a data sequence that has been successively designated as outgoing data from a start time of a periodically executed transmission process up until a current time,
determine whether a time equal to the current time plus the required time matches the start time of a periodically executed communication process between nodes in any of the plurality of node groups, and
designate data from among the data group as outgoing data based on a relationship between the time equal to the current time plus the required time and the start time,
the data from among the data group differs from data being sent by the periodically executed communication process.

13. A node on a network in which a plurality of node groups are connected via at least one junction apparatus, the node comprising:
a memory; and
a processor coupled to the memory and configured to execute a process, the process including:
taking data successively designated as outgoing data from among a data group, and transmitting the data to a node selected from the node group from among the plurality of node groups that contains a current node,
computing, based on transmission capabilities of the network, a required time to transmit a data sequence that has been successively designated as outgoing data from a start time of a periodically executed transmission process up until a current time,
determining whether a time equal to the current time plus the required time matches the start time of a periodically executed communication process between nodes in any of the plurality of node groups, and
designating data from among the data group as outgoing data based on the determining,
the data from among the data group differs from data being sent by the periodically executed communication process.

14. A computer-readable, non-transitory medium storing therein a communication program that causes a computer of a first node to execute a process, the computer of the first node executing primary communication and secondary communication via a network between a first node group and a second node group, the first node group including the first node and a second node, the second node group including a third node and a fourth node, the process comprising:
receiving, from the second node, data related to the secondary communication conducted between the second node and the fourth node;
setting a communication path via the network between the first node and the third node;
computing, based on transmission capabilities of the network, a required time to transmit data that has been designated as outgoing data from a start time of a periodically executed transmission process with regard to the primary communication up until a current time, wherein the designated data is data from among the received data that has been successively designated as outgoing data;
determining whether a time equal to the current time plus the required time matches the start time of the primary communication periodically conducted between the second node and the fourth node; and deciding which data from among the received data to designate as outgoing data based on the determining, the data designated from among the received data by the deciding differs from data being sent by the primary communication.

15. A communication method whereby a computer of a first node executes primary communication and secondary communication via a network between a first node group and a second node group, the first node group including the first node and a second node, the second node group including a third node and a fourth node, the communication method comprising:

receiving, from the second node, data related to the secondary communication conducted between the second node and the fourth node;

setting a communication path via the network between the first node and the third node;

computing, based on transmission capabilities of the network, a required time to transmit data that has been designated as outgoing data from the start time of a periodically executed transmission process with regard to the primary communication up until a current time, wherein the designated data is data from among the received data that has been successively designated as outgoing data;

determining whether a time equal to the current time plus the required time matches the start time of the primary communication periodically conducted between the second node and the fourth node; and deciding which data from among the received data to designate as outgoing data based on the determining, the data designated from among the received data by the deciding differs from data being sent by the primary communication.

16. The communication method according to claim 15, further comprising:

when the determining determines that the time equal to the current time plus the required time matches the start time of the primary communication, extracting data from among the received data, wherein the extracted data is arbitrary data that is not destined for the third node of the second node group provided with the fourth node set as the destination of the primary communication, and wherein the deciding designates the data extracted by the extracting as outgoing data.

17. The communication method according to claim 16, further comprising:

designating data from among the data extracted by the extracting as outgoing data, wherein the data size of the designated data is less than or equal to the data size of data related to the primary communication executed between the second node and the fourth node at the time equal to the current time plus the required time.

18. The communication method according to claim 16, wherein when the determining determines that the time equal to the current time plus the required time does not match the start time of the primary communication, the computing computes, based on the transmission capabilities of the network, an amount of data that can be transmitted in the remaining time between the time equal to the current time plus the required time, and the start time of the primary communication, and wherein the extracting extracts, from the received data, an amount of data that is less than or equal to the computed amount of data.

19. The communication method according to claim 15, wherein in a case where no outgoing data exists from among the received data, the deciding designates data that will be discarded at a junction apparatus of the network as the outgoing data.

20. The communication method according to claim 15, further comprising:

transmitting data to the second node, wherein the transmitted data is data that has been successively designated as outgoing data from among the data received from the third node via the communication path.

* * * * *